(12) United States Patent
McKaigue et al.

(10) Patent No.: US 12,449,082 B2
(45) Date of Patent: Oct. 21, 2025

(54) APPARATUS AND METHOD FOR TAPPING A VALVE OF A HOST PIPE LINED WITH A LINER

(71) Applicant: FER-PAL Construction Ltd., Toronto (CA)

(72) Inventors: Shaun McKaigue, Gilford (CA); Vadim Kosseniouk, Aurora (CA)

(73) Assignee: FER-PAL Construction Ltd., Toronto (CA)

( * ) Notice: Subject to any disclaimer, the term of this patent is extended or adjusted under 35 U.S.C. 154(b) by 0 days.

(21) Appl. No.: 18/144,334

(22) Filed: May 8, 2023

(65) Prior Publication Data

US 2023/0358354 A1  Nov. 9, 2023

Related U.S. Application Data

(60) Provisional application No. 63/339,178, filed on May 6, 2022.

(51) Int. Cl.
*B23P 15/00* (2006.01)
*F16L 21/08* (2006.01)
(Continued)

(52) U.S. Cl.
CPC ............ *F16L 47/14* (2013.01); *B23P 15/001* (2013.01); *F16L 21/08* (2013.01); *F16L 41/04* (2013.01);
(Continued)

(58) Field of Classification Search
CPC . F16L 41/04; F16L 41/08; F16L 21/08; F16L 55/265; F16L 55/179; F16L 55/165–1658; F16L 55/11
See application file for complete search history.

(56) References Cited

U.S. PATENT DOCUMENTS 2,180,960 A * 11/1939 Kennedy ............... F16L 41/088
                                                         285/286.1
4,848,801 A *  7/1989 Grabowski ............. F16L 31/02
                                                         285/200
(Continued)

FOREIGN PATENT DOCUMENTS

GB        2325294 A  * 11/1998  ............. F16L 41/04
GB        2508215 A  *  5/2014  ............. F16L 55/179
WO   WO-0055539 A1  *  9/2000  ............. F16L 55/179

*Primary Examiner* — Jacob J Cigna
(74) *Attorney, Agent, or Firm* — Reed Smith LLP; Matthew P. Frederick; Paul J. McDonnell

(57) ABSTRACT

An apparatus, system, and method for tapping and reinforcing a valve of a liner lined host pipe with a fitting device assembly that includes a service sleeve having a flange, a cylindrical body, and an engaging end and a reinforcing sleeve having a flange, a cylindrical body, an engaging end having at least one annular ratchets configured to engage with the engaging end of the service sleeve in order to secure the service sleeve and the reinforcing sleeve together, and a plurality of cutouts in the cylindrical body. A cork assembly that includes the service sleeve and a cork having at least one radial appendage is inserted into the valve, then the host pipe is lined with a liner. The cork assembly is located, and the cork is removed from the cork assembly. The reinforcing sleeve is then installed into the service sleeve in the valve.

5 Claims, 20 Drawing Sheets

(51) Int. Cl.
*F16L 41/04* (2006.01)
*F16L 47/02* (2006.01)
*F16L 47/14* (2006.01)
*F16L 55/165* (2006.01)
*F16L 55/179* (2006.01)
*F16L 55/26* (2006.01)

(52) U.S. Cl.
CPC ............ *F16L 47/02* (2013.01); *F16L 55/179* (2013.01); *F16L 55/165* (2013.01); *F16L 55/265* (2013.01)

(56) References Cited

U.S. PATENT DOCUMENTS

| | | | | |
|---|---|---|---|---|
| 5,275,442 A * | 1/1994 | Keldany | ............... | F16L 55/179 285/97 |
| 5,370,426 A * | 12/1994 | Meyers | .................. | B29C 66/71 285/286.1 |
| 6,056,017 A * | 5/2000 | Kamiyama | ......... | B29C 63/0086 264/269 |
| 6,688,337 B2 * | 2/2004 | Ward | .................... | F16L 55/265 405/150.1 |
| 8,015,695 B2 * | 9/2011 | Polivka | ................. | F16L 55/265 29/402.09 |
| 8,049,634 B2 * | 11/2011 | Smith | .................... | F16L 41/04 340/603 |
| 11,391,407 B2 * | 7/2022 | Baxter | .................... | E03B 7/006 |
| 11,724,318 B2 * | 8/2023 | Baxter | ................. | F16L 55/265 137/15.14 |
| 2005/0184470 A1 * | 8/2005 | Tincknell | ................ | F16L 37/04 277/602 |
| 2009/0289451 A1 * | 11/2009 | Oxner | .................. | F16L 41/026 285/189 |
| 2010/0187813 A1 * | 7/2010 | Anders | ................ | F16L 55/179 285/204 |
| 2011/0318099 A1 * | 12/2011 | Le Quere | ................ | F16C 1/107 403/376 |
| 2018/0230339 A1 * | 8/2018 | Ramsay | .................... | C09J 7/38 |
| 2020/0173599 A1 * | 6/2020 | Baxter | ................... | E03B 7/006 |
| 2020/0263822 A1 * | 8/2020 | McKaigue | ............. | B29C 73/04 |

\* cited by examiner

STEP 301

STEP 305

STEP 1001

STEP 1003

APPARATUS AND METHOD FOR TAPPING A VALVE OF A HOST PIPE LINED WITH A LINER

CROSS-REFERENCE RELATED APPLICATIONS

This application claims priority to the U.S. Provisional Patent Application No. 63/339,178 filed on May 6, 2022 under 35 U.S.C. § 119, the disclosure of which is incorporated herein by reference in its entirety.

BACKGROUND

Conduit systems may be used to transfer or convey material, such as water, other fluids, gases, steam, or solid material, from location to location for distribution throughout the system. For example, conduit systems are used to distribute water to residences and business for further use.

In these conduit systems, liners may be installed into host pipes to remedy cracks in pipes and prevent leaking.

SUMMARY

Figure 1:
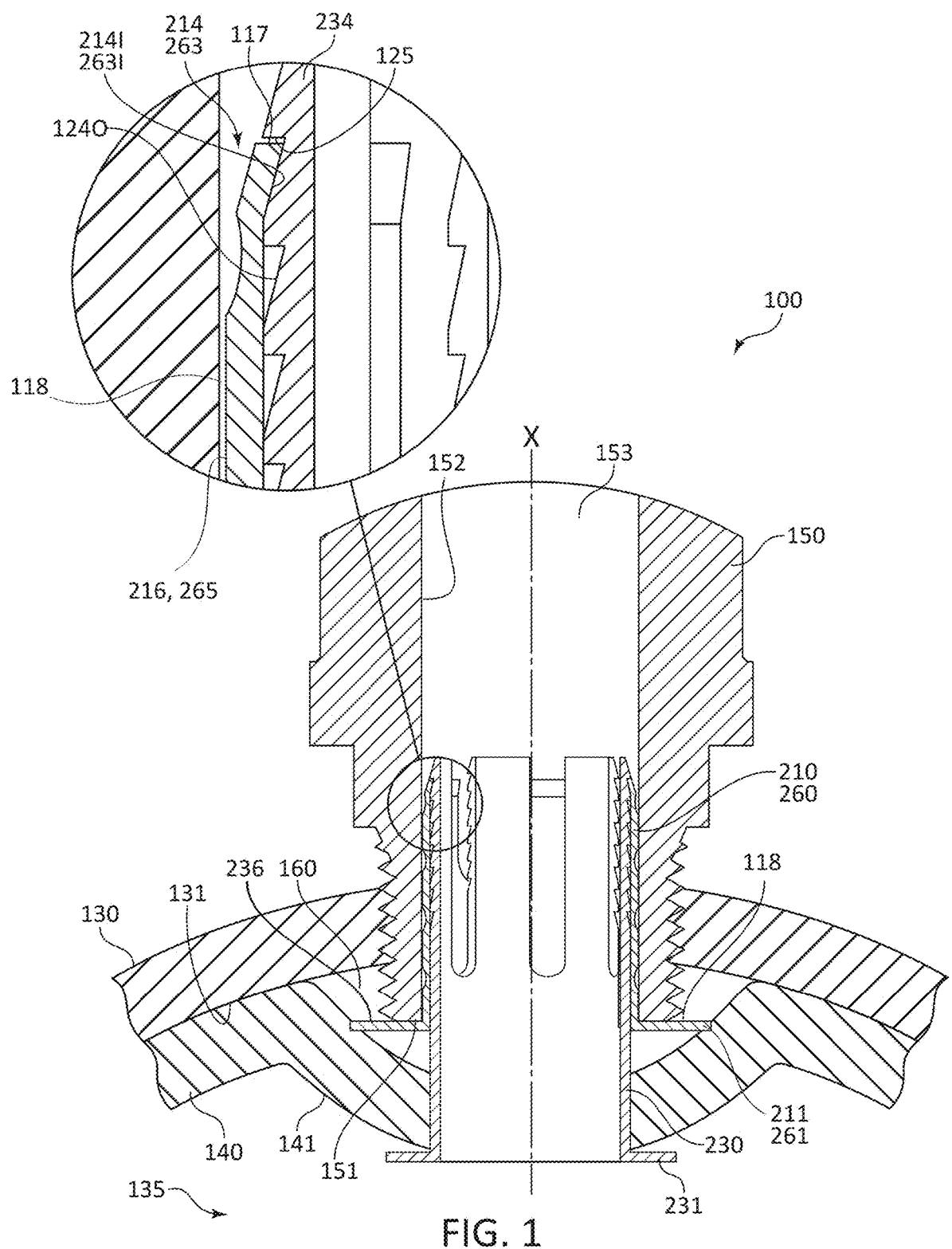
FIG. 1 illustrates a cross section through a service sleeve and a reinforcing sleeve of a fitting device assembly in an installed configuration in a valve of a liner-lined host pipe according to exemplary embodiments of this disclosure.

According to exemplary embodiments of this disclosure, a fitting device assembly may include a service sleeve comprising. The service sleeve may include a flange, an engaging end distal to the flange, and a cylindrical housing extending from the flange to the engaging end of the service sleeve. The cylindrical housing of the service sleeve may include an outer cylindrical surface comprising a circumference that may be configured to be smaller than a circumference of an interior surface of a valve. The fitting device assembly may further include a reinforcing sleeve that may include a flange, an engaging end distal to the flange, and a cylindrical housing extending from the flange to the engaging end. The cylindrical hosing of the reinforcing sleeve may include a plurality of cutouts extending from the engaging end of the reinforcing sleeve distal to the flange of the reinforcing sleeve and at least one annular ratchet formed on an exterior surface of the reinforcing sleeve at the engaging end. The reinforcing sleeve may be received within the housing of the service sleeve, and the at least one ratchet may be configured to engage the service sleeve at the engaging end of the service sleeve and prevent axial movement of the reinforcing sleeve in a direction toward the flange of the reinforcing sleeve. The flange of the service sleeve may be configured to rest in a layer of epoxy between a liner and a host pipe and is configured to abut an axial surface of the valve and form a seal therewith, and the flange of the of the reinforcing sleeve may be configured to contact an interior surface of the liner to prevent axial movement of the reinforcing sleeve in a direction toward the flange of the reinforcing sleeve and may form a seal therewith.

In some embodiments, the fitting device assembly may further include an outer surface of the service sleeve that may include a grooved surface configured to receive an adhesive, where the adhesive may be configured to secure the service sleeve to the interior surface of the valve.

In some embodiments, the service sleeve of the fitting device assembly may further include at least one curved member formed on an internal surface of the engaging end of the service sleeve. Each ratchet of the at least one ratchet of the reinforcing sleeve may be a curved surface, where the curved member of the service sleeve may be configured to engage the curved surface of the reinforcing sleeve.

In some embodiments, the service sleeve of the fitting device assembly may include at least one annular ratchet formed on an exterior surface of the engaging end of the service sleeve, where the at least one annular ratchet of the service sleeve may be configured to engage an interior surface of the valve.

In some embodiments, the fitting device assembly may further include an adhesive applied between the service sleeve and the reinforcing sleeve that may be configured to secure the service sleeve and the reinforcing sleeve together.

In some embodiments, the surface sleeve of the fitting device assembly, may include at least one ratchet at an end distal to the flange, and the ratchet may engage with the exterior surface of the reinforcing sleeve.

In some embodiments, the service sleeve of the fitting device assembly may include one or more cutouts extending from the engaging end of the service sleeve toward the flange, and each of the one or more radial appendages of the cork may extend through a respective one or the plurality of cutouts of the service sleeve and abut the interior surface of the valve to prevent contact between the outer surface of the service sleeve and the interior surface of the valve.

In some embodiments, the service sleeve of the fitting device assembly may further include a rounded radial projection, and the at least one ratchet of the reinforcing sleeve may be at least two ratchets that define between them a rounded receiving portion that may be configured to receive the rounded radial projection of the service sleeve.

According to exemplary embodiments of the present disclosure, a cork assembly may include a service sleeve that may include a flange, an engaging end distal to the flange, and a cylindrical housing extending from the flange to the engaging end. The cylindrical housing may include an outer surface and a cork disposed within the cylindrical housing of the service sleeve. The cork may include a body, at least one radial appendage extending radially from the body and radially beyond the outer surface of the cylindrical housing of the service sleeve, and a first magnetic element disposed within the cork. In some embodiments, the at least one radial appendage may be plastically deformable. The first magnet element may include at least one light source that may be configured to illuminate when a second magnet magnetic element is in a vicinity of the first magnetic element.

In some embodiments, the service sleeve of the cork assembly may further include at least one cutout extending from the engaging end toward the flange. In some embodiments, each radial appendage of the at least one radial appendage of the cork may extend through a respective one of the at least one cutout of the service sleeve.

In some embodiments, the at least one plastically deformable radial appendage may be four radial appendages, and the at least one cutout may be four cutouts.

In some embodiments, each of the four radial appendages may extend radially outward through a respective cutout of the cylindrical housing and radially beyond the outer surface of the cylindrical housing. In some embodiments each of the four radial appendages may be configured to contact an interior surface of a valve and guide the cork assembly into the valve such that an axis of symmetry of the cork assembly may substantially align with an axis of symmetry of the valve.

In some embodiments, the cork of the cork assembly may further include at least one intermediate flange positioned axially between the flange of the cork and the at least one radial appendage, where the at least one intermediate flange may be configured to abut an inner surface of the cylindrical housing of the service sleeve. In some embodiments, the at least one intermediate flange may include a first intermediate flange having an axial end face that may be configured to contact an axial end face of the engaging end of the service sleeve, and a second intermediate flange may be configured to abut the inner surface of the inner surface of the cylindrical housing.

According to exemplary embodiments of the present disclosure, a method for reinforcing a coupling between a valve of a conduit pipe and a host pipe lined with a liner may include installing a cork assembly into the valve. In some embodiments, the cork assembly may include a service sleeve that may include a flange, an engaging end distal to the flange, and a cylindrical housing extending from the flange to the engaging end, and a cork disposed within the cylindrical housing of the service sleeve. The method may include installing a liner in the host pipe, wherein a layer of epoxy may secure the liner to the host pipe, and the flange of the service sleeve of the cork assembly may rest between the liner and the host pipe. The method may further include removing the plastic cork from the cork assembly, installing a reinforcing sleeve into the service sleeve installed in the valve. In some embodiments, the reinforcing sleeve may include a flange, an engaging end distal to the flange, and a cylindrical housing extending from the flange to the engaging end. In some embodiments, the cylindrical hosing of the reinforcing sleeve may include at least one cutout extending from the engaging end toward the flange and at least one annular ratchet formed on an outer surface of the reinforcing sleeve at the engaging end. In some embodiments, installing the reinforcing sleeve may include inserting the reinforcing sleeve into the service sleeve until at least one annular ratchet engages the engaging end of the service sleeve and until the flange of the service sleeve contacts an interior surface of the liner. In some embodiments, a radius of the cylindrical housing of the service sleeve may be greater than a radius of the cylindrical housing of the reinforcing sleeve.

In some embodiments, the cork of the cork assembly may include a body, at least one plastically deformable radial appendage extending radially from the body, and a first magnetic element disposed within the cork. In some embodiments, the first magnet element may include at least one light source that may be configured to illuminate when a second magnet magnetic element is in a vicinity of the first magnetic element.

In some embodiments, removing the cork may include detecting a location of the first magnetic element disposed within the cork, drilling a hole through the liner at the location of the first magnetic element, and drilling out the cork from the cork assembly through the hole in the liner.

In some embodiments, a robot disposed within the host pipe may install the cork assembly, remove the cork from the cork assembly, and install the reinforcing sleeve. In some embodiments, the robot may further detect the location of the first magnetic element, drill the hole through the liner, and extract drill out the cork from the cork assembly.

DESCRIPTION

This disclosure describes exemplary embodiments of an apparatus, system, and method for tapping and reinforcing a valve of a host pipe lined with a liner.

Various embodiments of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these embodiments are provided so that this disclosure will be thorough and will fully convey the scope of the disclosure to those skilled in the art. Based on the teachings herein, one skilled in the art would appreciate that the scope of the disclosure can be intended to cover any embodiment of the novel systems, apparatuses, and methods disclosed herein, whether implemented independently of, or combined with, any other embodiment of the disclosure. For example, an apparatus may be implemented or a method may be practiced using any number of the embodiments set forth herein. In addition, the scope of the disclosure can be intended to cover such an apparatus or method that can be practiced using other structure, functionality, or structure and functionality in addition to or other than the various embodiments of the disclosure set forth herein. It should be understood that any embodiment disclosed herein may be implemented by one or more elements of a claim.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

It will be recognized that while certain embodiments of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

FIG. 1 illustrates a fitting device assembly 100 with an axis of symmetry X in an installed configuration in a valve 150 of a host pipe 130. In some embodiments, fitting device assembly 100 may include a service sleeve 210, 260 and a reinforcing sleeve 230 inserted within an inner diameter of service sleeve 210. Valve 150 may serve as a tap point for connecting a conduit (not illustrated) to a host pipe 130 to allow fluid communication between an internal passageway 153 of valve 150 and an internal passageway 135 of host pipe 130. In some embodiments, a liner 140 may be installed within host pipe 130 and line an inner surface 131 of host pipe 130. In some embodiments, a layer of epoxy 160 may be present between host pipe 130 and liner 140 in order to adhere liner 140 to an interior surface 131 of host pipe 130.

In some embodiments, as discussed in greater detail with reference to FIGS. 3A-3E and 10A-10E, service sleeve 210, 260 and a cork 220 (see, e.g., FIGS. 2A, 2B) may be installed in internal passageway 153 of valve 150. Once service sleeve 210, 260 and cork 220 are installed in valve 150, liner 140 may be installed in internal passageway 135 of host pipe 130 and may line interior surface 131 of host pipe 130. In some embodiments, an adhesive 118 may be applied to an outer surface 216, 265 of service sleeve 210, 260 before it is inserted into valve 150 such that, once inserted, adhesive 118 may contact valve 150 and cure to adhere service sleeve 210, 260 to valve 150. In some embodiments, adhesive 118 may be A61 acrylic adhesive or any adhesive that meets NSF (National Sanitation Foundation)/ANSI (American National Standard Institute) Standard 61 for drinking water system components.

In some embodiments, a layer of epoxy 160 between liner 140 and host pipe 130 may be used to help secure liner 140 to interior surface 131 of host pipe 130. In some embodiments, a portion of service sleeve 110, e.g., a flange 211, 261 of service sleeve 210, 260 may abut an axial surface 151 of valve 150 and form a seal therewith to seal valve 150 and prevent fluids, gases, and solids, including epoxy 160, from seeping into valve 150. In some embodiments, an adhesive 118 may be applied to flange 211, 261 and help form the seal with axial surface 151. In some embodiments, flange 211, 261 may also rest in layer of epoxy 160 between liner 140 and interior surface 131 of host pipe 130. As explained in greater detail with reference to FIGS. 3C and 10C, flange 211, 261 may form a seal with axial surface 151 of valve 150 before epoxy 160 is applied to host pipe 130 such that there may be no epoxy 160 between flange 211, 261 and axial surface 151. Once liner 140 has been installed, reinforcing sleeve 230 may be installed into internal passageway 153 of valve 150 by insertion through an opening 144 (see, e.g., FIGS. 3E, 10E) in liner 140 and into an interior of service sleeve 210, 260. In some embodiments, an exterior surface of reinforcing sleeve 230 may include one or more annular ratchets 234 that secure reinforcing sleeve 230 within service sleeve 210, 260. In some embodiments, reinforcing sleeve 230 may be inserted into service sleeve 210 along axis X, and an annular ratchet of one or more annular ratchets 234 may pass an engaging end 214, 263 of service sleeve 210, 260 distal to flange 211, 261 of service sleeve 210, 260. Engaging end 214, 263 of service sleeve 210, 260 may abut or be adjacent to an axially facing engaging surface 125 of annular ratchet 234 such that reinforcing sleeve 230 may be secured to service sleeve 210, 260. In other words, axial movement of reinforcing sleeve 230 out of internal passageway 153 of valve 150 and into internal passageway 135 of host pipe 130 may be restricted by the interference between engaging end 214, 263 of service sleeve 210, 260 and engaging surface 125 of annular ratchet 234. In some embodiments, a flange 231 of reinforcing sleeve 230 may abut or be adjacent to an interior surface 141 of liner 140. In some embodiments, interference between flange 231 of reinforcing sleeve 230 and interior surface 141 of liner 140, in particular between an upper axial surface 236 of flange 231 and interior surface 141 of liner 140, may prevent axial movement of reinforcing sleeve 230 further into internal passageway 153 of valve 150. In this way, reinforcing sleeve 230 may be secured within service sleeve 210, 260 in valve 150 in an installed configuration of fitting device assembly 100. Flange 231 may also form a seal between inner surface 141 of liner 140 and axial surface 236 of flange 231 to ensure fluid communication between internal passageway 153 of valve 150 and internal passageway 135 of host pipe 130 lined with liner 140.

Throughout this disclosure, particular dimensions of each of a service sleeve, a cork, and a reinforcing sleeve and their component parts are described with reference to embodiments of the present disclosure in which an interior diameter of valve 150, into which a service sleeve, a cork, and a reinforcing sleeve may be inserted, measured from interior surface 152 of valve 150 is about 0.75 inches. However, it will be appreciated by a person of ordinary skill in the art that embodiments of a service seal, cork, and reinforcing sleeve described herein may be used in a valve 150 of varying dimensions ranging between about 0.50 inches in interior diameter and about 2 inches in interior diameter. A person of ordinary skill in the art will further appreciate that the dimensions of the service seal, the cork, and the reinforcing sleeve may scale accordingly with the diameter of valve 150. For example, in embodiments in which an interior diameter of valve 150 is 1.5 inches (i.e., double 0.75 inches), the dimensions of the service seal, cork, and reinforcing seal described herein may be doubled to scale accordingly with the interior diameter of valve 150.

Figure 2A:
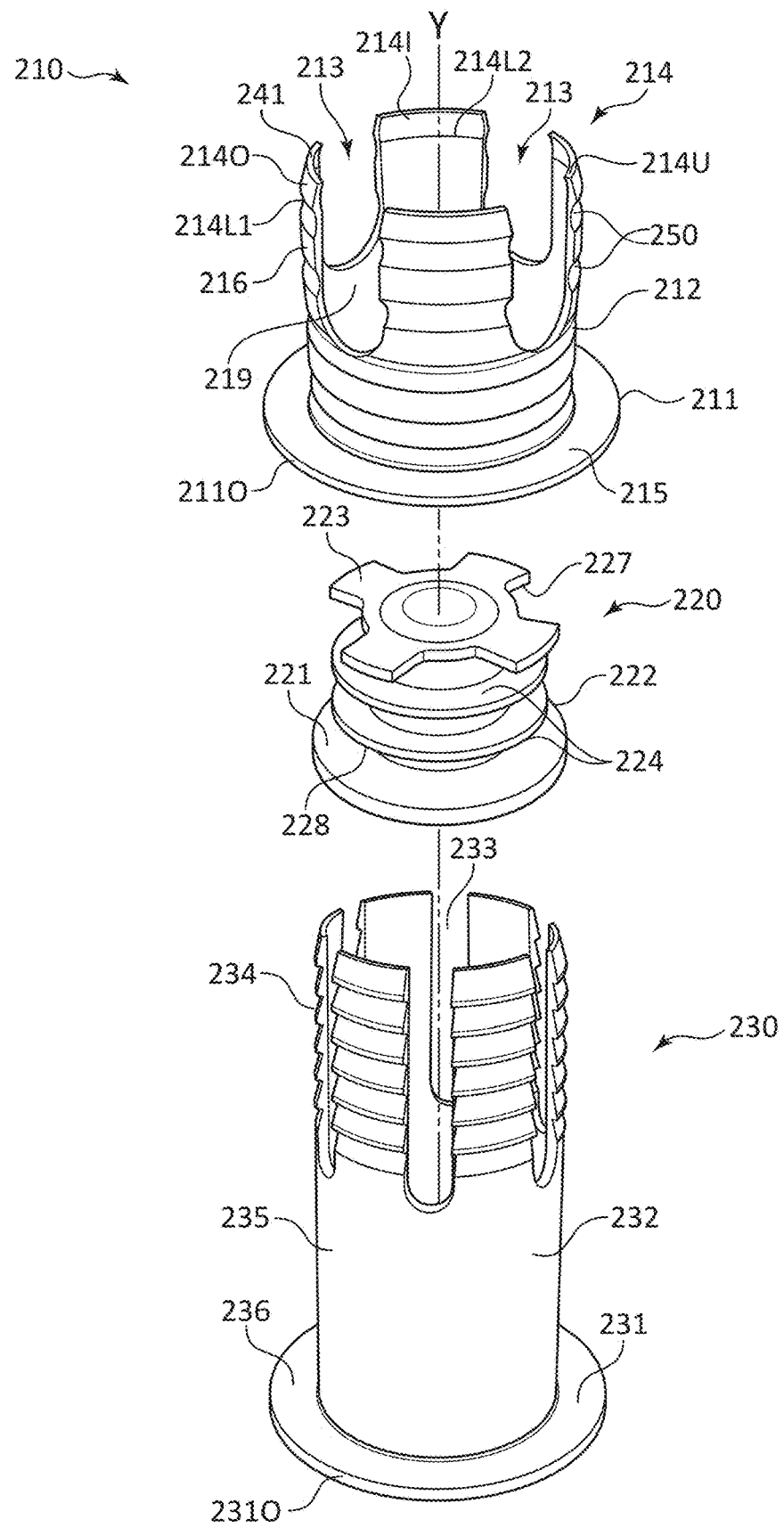
FIG. 2A illustrates an exploded view of a service sleeve with one or more cut outs, a cork, and a reinforcing sleeve according to exemplary embodiments of this disclosure.

FIG. 2A illustrates a service sleeve 210, a cork 220, and a reinforcing sleeve 230 according to exemplary embodiments of the present disclosure. In some embodiments, a service sleeve 210 having an axis of symmetry Y may include a cylindrical housing 212 extending from an annular flange 211 in which an outer radius of flange 211 may be greater than an outer radius of cylindrical housing 212. Service sleeve 210 can further include an engaging end 214 at an end of cylindrical housing 212 distal to annular flange 211, and engaging end 214 may include an axial end face 241. In some embodiments, an outer surface 216 of service sleeve 210 may be ribbed by a plurality of indentations 250 to form a grooved surface. As discussed with reference to FIG. 3B, an adhesive 318 may be applied to and cover the entire outer surface 216 of service sleeve 210 before service sleeve 210 is inserted into a valve, e.g., valve 150, to adhere service sleeve 210 to an interior surface 152 of valve 150.

When service sleeve 210 is inserted into valve 510, an interior diameter of internal passageway 153 of valve 150 will decrease due to the radial thickness of service sleeve 210. This reduction in interior diameter of internal passageway 153 may restrict the flow of fluids between valve 150 and internal passageway 135 of host pipe 130 and may reduce the volume of fluids that may flow through valve 150. In order to minimize the reduction in interior diameter of internal passageway 153 and therefore minimize the restriction of the flow of fluids between valve 150 and internal passageway 135 of host pipe 130, it is advantageous to form outer surface 216 as a grooved surface so that adhesive 318 may fill plurality of indentations 250 or grooves. By filing plurality of indentations 250, a radial extension of adhesive 318 radially beyond outer surface 216 of service sleeve 210 may be reduced, minimizing the overall reductions in the interior diameter of internal passageway 153 of valve 150.

In some embodiments, a ribbing of outer surface 216 may include a plurality of circular indentations with a peak radial depth of about 0.011 inches, and a radius of each circular indentation may be about 0.094 inches to allow for a sufficient amount of adhesive to fill the plurality of indentations. In other embodiments, an amount of adhesive is applied to also cover outer surface 216 and not just indentations 250. The adhesive secures outer surface 216 of service sleeve 210 to interior surface 152 of valve 150.

In some embodiments, cylindrical housing 212 of service sleeve 210 may include one or more cutouts 213 that may extend axially from engaging end 214, through cylindrical housing 212, and terminate before flange 211.

In some embodiments, each cutout of one or more cutouts 213 may be evenly spaced from each other about cylindrical housing 212. Alternatively, each cutout of one or more cutouts 213 may not be evenly spaced about cylindrical housing 212. In some embodiments one or more cutouts 213 may be four cutouts.

In some embodiments, one or more cutouts 213 may be shaped as a rectangular segment with a semicircular segment located at a short end of the rectangular segment closest to flange 211. A radial length of each cut out measured at the rectangular segment of one or more cutouts 213 may be about 0.313 inches. A radius of the semicircular portion may be about 0.156 inches. In some embodiments, an annular width of one or more cutouts 213 may be about 0.25 inches.

In some embodiments, an engaging end 214 of service sleeve 210 may be tapered inward from a first lower boundary 214L1 to an upper boundary 214U. In some embodiments, engaging end 214 may be tapered inward at an angle of approximately 15° measured from an outer surface 216 of service sleeve 210. In some embodiments, a radial thickness of an axial face 241 of engaging end 214 measured at upper boundary 214U may be about 0.019 inches. In some embodiments, an axial length of axial end face 241 of engaging end 214 may be about 0.075 inches.

In some embodiments, an outer surface of engaging end 214 may tapered radially inward from first lower boundary 214L1 to upper boundary 214U. In further embodiments, an inner surface 2141 of engaging end 214 may be tapered radially inward from a second lower boundary 214L2 to upper boundary 214U of service sleeve 210 located axially between upper boundary 214U and first lower boundary 214L1. In other words, inner surface 2141 of engaging end 214 may begin to taper before outer surface 2140 begins to taper. By tapering inside surface 2141 before outside surface 2140, service sleeve 210 may be "widened" at engaging end 214. This has the effect of increasing a radial thickness of service sleeve 210, as a radial thickness of engaging end 214 will be larger than a radial thickness of cylindrical housing 212. Doing so helps strengthen service sleeve 210 at engaging end 214. Because engaging end 214 is inserted into valve 150 first when service sleeve 210 is inserted (see, e.g., FIG. 3B), engaging end 214 is more likely to break or be otherwise deformed during insertion of service sleeve 214 into valve 150 than cylindrical housing 212. For example, if service sleeve 214 is not centered about axis of symmetry X of valve 150 during insertion, e.g., by aligning axis of symmetry Y of service sleeve 210 with axis of symmetry X of valve 150, then engaging end 214 may contact axial surface 151 of valve 150 and resist insertion of service sleeve 210. This contact, as well as subsequent force exerted to overcome this resistance in an attempt to insert service sleeve 210 into valve 150, may damage engaging end 214, which may in turn prevent insertion of reinforcing sleeve 230 (e.g., if engaging end 214 if deformed radially inward too far, then reinforcing sleeve 230 cannot be inserted through service sleeve 210). Thus, it is advantageous for the engaging end to be configured with a sufficient radial thickness to reduce the likelihood that the service sleeve the engaging end breaks or is deformed radially inward such that the reinforcing sleeve cannot be inserted into the service sleeve.

Tapering outer surface 2140 of engaging end 214 assists with insertion of service sleeve 210 into a valve, e.g., valve 150, as a tapered outer surface facilitates sliding service sleeve 210 into valve 150 and removes a sharp outer edge from engaging end 214 that is more likely to snag or otherwise oppose insertion of service sleeve 210 into valve 150.

In some embodiments, an axial distance between lower boundary 214L and upper boundary 214U may be about 0.075, and an axial distance between the annular position and upper boundary 214U may be about 0.056.

In some embodiments, a diameter of flange 211, measured from an outer annular edge 2110 of flange 211 to axis Y, may range from about 1.000 inch to about 1.234 inches. In some embodiments, an axial length of service sleeve 210 may be about 0.875 inches. In some embodiments, an outer diameter of service sleeve 210 measured from outer surface 216 may be about 0.738 inches. In some embodiments, an inner diameter of service sleeve 210 measured from interior surface 219 may be about 0.688 inches.

In some embodiments, a cylindrical housing 212 may taper inward at an annular inflection point between flange 211 and engaging end 214 such that an inner radius of service sleeve 210 at a first portion of service sleeve 210 located between the annular inflection point and engaging end 214 is less than an inner radius of service sleeve 210 at a second portion of service sleeve 210 located between the annular inflection point and flange 211. In such embodiments, the annular inflection point may be about 0.375 inches from engaging end 214. Further, in such embodiments, an inner radius of the second portion of service sleeve 210 may be about 0.688 inches and an inner radius of the first portion of service sleeve 210 may be about 0.658 inches.

In some embodiments, service seal 210 may be made of a non-corrosive material, such as, stainless steel, copper, and any other non-corrosive material that satisfies NSF/ANSI Standard 61 for drinking water system components. In some embodiments, service seal 210 may be made of AISI 316 Stainless Steel.

In some embodiments, a cork 220 may be defined by a cylindrical body 222 extending axially from an annular flange 221. At an end distal to flange 221, body 222 may include one or more radial appendages 223. In some embodiments, one or more radial appendages 223 may extend radially from and be spaced annularly about an axis of symmetry of cork 220, which may coincide with axis of symmetry Y of service sleeve 210. In some embodiments, one or more radial appendages 223 may be annularly spaced from one another with a constant pitch. Alternatively, each radial appendage of one or more radial appendages 223 may not be spaced from one another with a constant pitch. In some embodiments, one or more radial appendages 223 may be four radial appendages.

In some embodiments, an outer diameter of cylindrical body 222 may be about 0.5 inches, and an inner diameter of cylindrical body 222 may be about 0.4 inches. In some embodiments, a diameter of cork 220 measured at flange 221 may be about 0.880 inches. In some embodiments, a peak outer radius of each radial appendage 223 may be about 0.395 inches, and a width of each radial appendage 223 measured circumferentially may be about 0.230 inches. In some embodiments, an axial length of cork 220 may be about 0.710 inches.

In some embodiments, cork 220 may be made of a deformable material, such as low density polyethylene (LDPE), rubber, bioplastic, and any other plastic-like material that satisfies NSF/ANSI Standard 61 for drinking water system components.

In some embodiments, cylindrical body 222 of cork 220 may further include one or more intermediate annular flanges 224 extending radially from cylindrical body 222 and disposed axially between flange 221 and one or more radial appendages 223. In some embodiments, an outer radius of intermediate flanges 224 may be less than an outer radius of flange 221. In some embodiments, one or more intermediate flanges 224 may include 2 intermediate flanges. In some embodiments, an outer radius of intermediate flange 224 may be about 0.730 inches and an axial thickness of intermediate flange 224 may be about 0.07 inches.

In some embodiments, cork 220 may include a magnetic element 225 (see FIGS. 3B-3C, 10B-10C) disposed within cork 220 that may in turn include at least one light source 226 (see FIGS. 3B-3C, 10B-10C). In some embodiments, cork 220 may be molded around magnetic element 225 to dispose magnetic element 225 within cork 220. Alternatively, magnetic element 225 may be inserted into cork 220 after cork 220 has been molded, such as where cork 220 is molded with a hollow cylindrical housing 221. In some embodiments, when a second magnetic element, e.g., second magnetic element 320, 1020 (see FIGS. 3D, 10D), is introduced in a vicinity of magnetic element 225 of cork 220, at least one light source 226 of magnetic element 225 of cork 220 may illuminate. When second magnetic element 320, 1020 is not in a vicinity of magnetic element 225 of cork 220, at least one light source 226 of magnetic element 225 of cork 220 may not illuminate. Illuminating light source 226 helps more accurately locate the position of cork 220 once inserted into valve 150 and covered with liner 140, increase the likelihood of success in cutting liner 140 at the correct position to remove cork 220 from valve 150.

In some embodiments, a vicinity may be about 2 inches. How small or large the vicinity is for second magnetic element 230, 1020 to cause at least one light source 226 of first magnetic element 225 to illuminate can be proportional to the magnetization of the material that host pipe 130 is made of, the strength of the magnetic field of magnetic element 320, 1020, and the sensitivity of first magnetic element 225.

In some embodiments, reinforcing sleeve 230 may include a cylindrical housing 232 extending axially along an axis of symmetry from an annular flange 231. In some embodiments, the axis of symmetry of reinforcing sleeve 230 may coincide with axis of symmetry Y of service sleeve 210, 260. Service sleeve 230 may include one or more annular ratchets 234 disposed on an outer surface 235 of service sleeve 230 at an end distal to flange 231. In certain embodiments, one or more annular ratchets 234 may have a profile including an elliptical profile or a triangular profile. In some embodiments, one or more annular ratchets 234 may engage with engaging end 214, 263 of service sleeve 210, 260 in order to secure reinforcing sleeve 230 together with service sleeve 210, 260 in an installed configuration as shown in, e.g., FIGS. 1, 4-9, 10E, 11. In some embodiments, an axial profile of one or more annular ratchets 234 of reinforcing sleeve 230 and an axial profile of engaging end 214, 263 of service sleeve 210, 260 may match. This helps ensure a secure engagement between at least one annular ratchet 234 and engaging end 214, 263 that prevents axial movement of reinforcing sleeve in the direction of host pipe 130. In other words, having a matching axial profile reduces the chance that reinforcing sleeve 230 may slip out of reinforcing sleeve 210, 260 in the direction of host pipe 130. As such, at least one annular ratchet 234 may be any shape that engages with engaging end 214, 263 of service sleeve 210, 260 to prevent axial movement of reinforcing sleeve 230 in the direction of host pipe 130.

In some embodiments, cylindrical housing 232 may further include one or more cutouts 233 extending from the end of cylindrical housing 232 distal to flange 231, through cylindrical housing 232, and terminating before flange 231. By including one or more cutouts 233, cylindrical housing 232 may flex radially inward when a radially inward force is applied to outer surface 235 of reinforcing sleeve 230, such as when reinforcing sleeve 230 is inserted into service sleeve 210, 260, while remaining biased to a resting position in which cylindrical housing 232 is not flexed radially inward. This radially inward flexing and bias to the resting position creates a spring-back effect that, when reinforcing sleeve 230 is inserted into service sleeve 210, 260, ensures that a ratchet of one or more ratchets 234 engages with engaging end 214, 263 of service sleeve 210, 260 and secures reinforcing sleeve 230 to service sleeve 210, 260. And because cylindrical housing 232 is allowed to flex during insertion into service sleeve 210, 260, the likelihood of reinforcing sleeve 230 breaking during installation is reduced compared to a reinforcing sleeve having no cutouts.

In some embodiments, each cutout of one or more cutouts 233 may be evenly spaced from each other about cylindrical housing 232. Alternatively, each cutout of one or more cutouts 233 may not be evenly spaced about cylindrical housing 232. In some embodiments, one or more cutouts 233 may be six cutouts. In other embodiments, one or more cutouts 233 may be four cutouts.

In some embodiments, cutouts 233 may be defined by a first axially extending side and an opposing second axially extending side that may be tapered outward at an angle of approximately 5° relative to axis Y. The angle at which each axially extending side defining cutouts 233 is tapered is related to the strength of the material from which reinforcing sleeve 230 is made, and therefore a larger cutout may be needed to allow a stronger material to flex inward enough to secure reinforcing sleeve 230 inside service sleeve 210, 260. In some embodiments, each cutout may have an axial length of between about 0.442 inches and about 0.943 inches. In certain embodiments, when reinforcing sleeve 230 is installed inside valve 150 (see FIG. 3E, 10E), cutouts 233 may not extend axially beyond axial surface 151 of valve 150 when reinforcing sleeve 230 is inserted into service sleeve 210, 260 to ensure a fluid seal between valve 150 and reinforcing sleeve 230 may be maintained.

In some embodiments, an annular width of each cutout 233 may be about 0.125 inches. Cutouts 233 are configured to enable the spring back effect of cylindrical housing 232 to allow reinforcing sleeve 230 to flex radially inward during installation into service sleeve 210, 260, and then flex radially outward due to its bias to the resting position to ensure that a ratchet of at least one ratchets 234 engages engaging end 214, 263 and secures reinforcing sleeve 230 to service sleeve 210 in internal passageway 153 of valve 150.

In some embodiments, an outer radius of flange 231 measured from axis Y to an outer annular edge 2310 of flange 231 may be about 0.5 inches. In some embodiments, an axial thickness of flange 231 may be about 0.031 inches.

In some embodiments, a total axial length of reinforcing sleeve 230 may be between about 0.875 inches and about 1.380 inches. A total axial length of one or more annular ratchets 234 may be between about 0.442 inches and about 0.568 inches. In some embodiments, an inner radius of cylindrical housing 232 of reinforcing sleeve 230 may be between about 0.275 inches and about 0.309 inches. In some embodiments, an outer radius of cylindrical housing 232 may be between about 0.3415 inches and about 0.344 inches. In some embodiments, a radial thickness of cylindrical housing 232 may decrease axially from an end of cylindrical housing 232 at flange 231 to one or more annular ratchets 234.

Figure 2B:
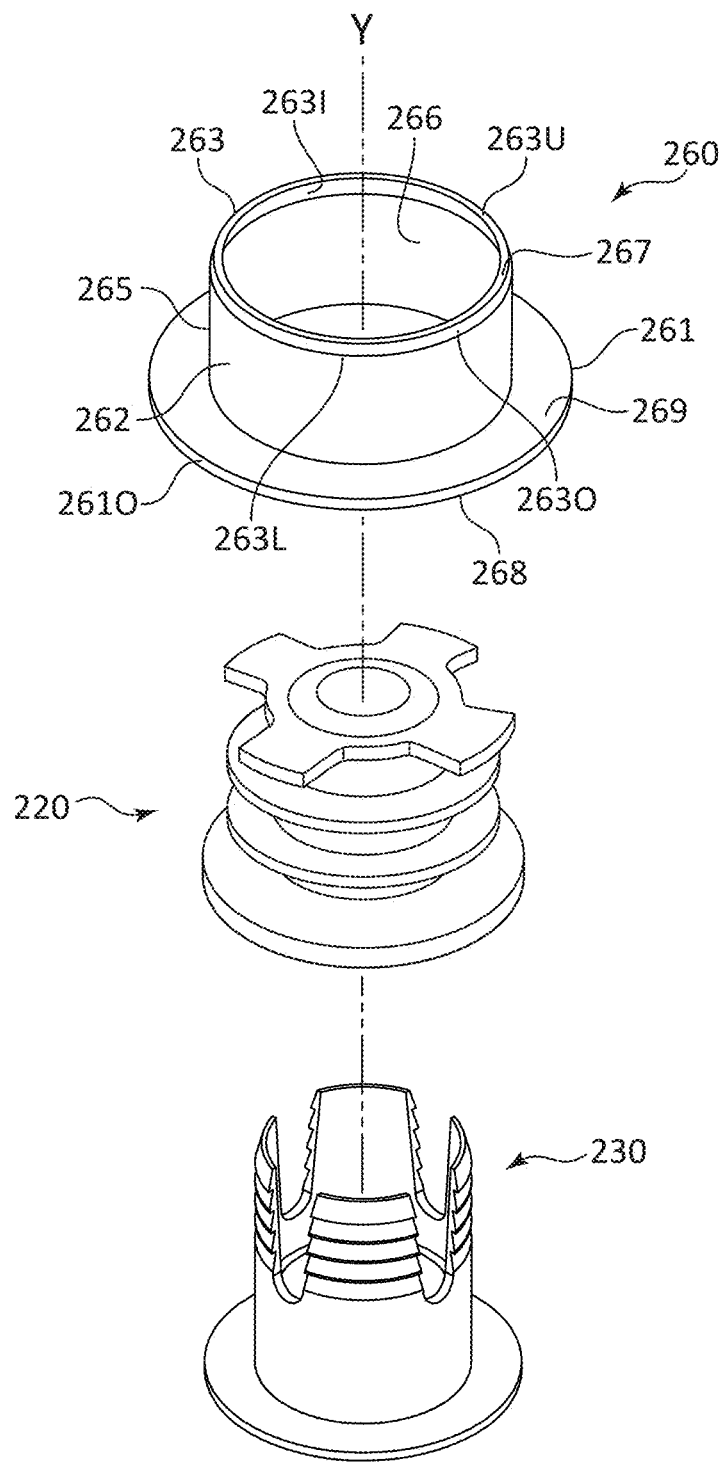
FIG. 2B illustrates an exploded view of a service sleeve without one or more cut outs, a cork, and a reinforcing sleeve according to exemplary embodiments of this disclosure.

As illustrated in FIG. 2B, a service sleeve, e.g., service sleeve 260, according to exemplary embodiments of the present disclosure, may include a cylindrical housing 262, having a central axis Y, that may be continuous, or unitary, between a flange 261 extending annular from a first end of cylindrical housing 262 and an engaging end 263 at a second end distal to flange 261. Unlike service sleeve 210 shown in FIG. 2A, service sleeve 260 shown in FIG. 2B may not include one or more cutouts extending from the flange to the end distal the flange. Because service sleeve 260 does not have any cutouts like service sleeve 210, it may have a reduced axial length as compared to an axial length of service sleeve 210. Service sleeve 260 may then compatible with smaller host pipes, for example host pipes that are 8 inches or less in diameter. Because service sleeve 260 may have a reduced axial length due to the fact that it has no cutouts, service sleeve 260 may be maneuvered more easily in the smaller host pipes as compared to service sleeve 210, making step 1005 of installing service sleeve 260 into valve 150 easier with service sleeve 260 in smaller host pipes 130, such as host pipes with a diameter of 8 inches or less. In some embodiments, a total axial length of service sleeve 260 measured from axial end face 267 to an axially outer surface 268 of flange 261 may be about 0.375 inches for installation into a host pipe 130 having a diameter of 8 inches or less. In some embodiments, an inner radius of cylindrical housing 262 may be about 0.344 inches. In some embodiments, an outer radius of cylindrical housing 262 may be about 0.3575 inches. For host pipes 130 with a diameter greater than 8 inches, service sleeve 210 or service sleeve 260 may be used.

In some embodiments, an engaging end 263 of service sleeve 260 may be tapered inward from a lower boundary 263L to an upper boundary 263U. In some embodiments, engaging end 263 may be tapered at an angle of approximately 15° measured from an outer surface 265 of cylindrical housing 262. In some embodiments, a radial thickness of an axial end face 267 of engaging end 263 measured at upper boundary 263U may be about 0.021 inches. In some embodiments, an axial length of engaging end 263 may be about 0.030 inches. In some embodiments, an outer radius of engaging end 263 measured at lower boundary 263L may be about 0.3575 inches, and an outer radius of engaging end 263 measured at upper boundary 263U may be about 0.3495 inches.

In some embodiments, an outer surface 2630 of engaging end 263 may be tapered inward from lower boundary 263L to upper boundary 263U, while an inner surface 2631 of engaging end 263 may be tapered inward from a second lower boundary (not shown) to upper boundary 263U. In some embodiments, lower boundary 263L may be positioned axially between the second lower boundary and upper boundary 263U. In other words, inner surface 2631 of engaging end 263 may begin to taper before outer surface 2630 begins to taper. By tapering inside surface 2631 before outside surface 2630, service sleeve 260 may be "widened." This has the effect of increasing a radial thickness of service sleeve 210, as a radial thickness of engaging end 263 will be larger than a radial thickness of cylindrical housing 262. Doing so may strengthen service sleeve 260 at engaging end 263 and may have the same advantages as those discussed above with respect to service sleeve 210 and FIG. 2A. In some embodiments, inner surface 2631 and outer surface 2630 may be tapered at an angle that may be substantially equal to the angle of inclination of each ratchet of one or more annular ratchets 234 of reinforcing sleeve 230. In some embodiments, the angle at which inner surface 2631 and outer surface 2630 are tapered may be approximately 15° relative to interior surface 266 and outer surface 265 of cylindrical housing 262, respectively. In some embodiments, an axial distance between lower boundary 263L and the second lower boundary may be about 0.026 inches.

Tapering outer surface 2630 of engaging end 263 may assist with insertion of service sleeve 260 into a valve, e.g., valve 150, as a tapered outer surface facilitates sliding service sleeve 260 into valve 150 and removes a sharp outer edge from engaging end 263 that is more likely to snag or otherwise oppose insertion of service sleeve 260 into valve 150.

In some embodiments, an outer radius of flange 261 measured from axis Y to an outer annular edge 2610 of flange 261 may be 0.5 inches. In some embodiments, an axial thickness of flange 261 may be about 0.031 inches.

FIGS. 3A-3E and FIGS. 10A-10E illustrate exemplary embodiments of a method 300 and 1000, respectfully, for reinforcing a coupling between a valve of a conduit and a host pipe lined with a liner. Throughout the discussion of method 300 shown in FIGS. 3A-3E, reference is made to service sleeve 210, e.g., a service sleeve that includes one or more cutouts. Through the discussion of method 1000 shown in FIGS. 10A-10E, reference is made to service sleeve 260, e.g., a service sleeve that does not include one or more cutouts. These methods 300 and 1000 will be described in tandem, and a separate description is provided where method 300 and 1000 differ depending on whether a service sleeve with one or more cutouts, e.g., service sleeve 210, or a service sleeve without one or more cut outs, e.g., service sleeve 260, is used.

Figure 3A:
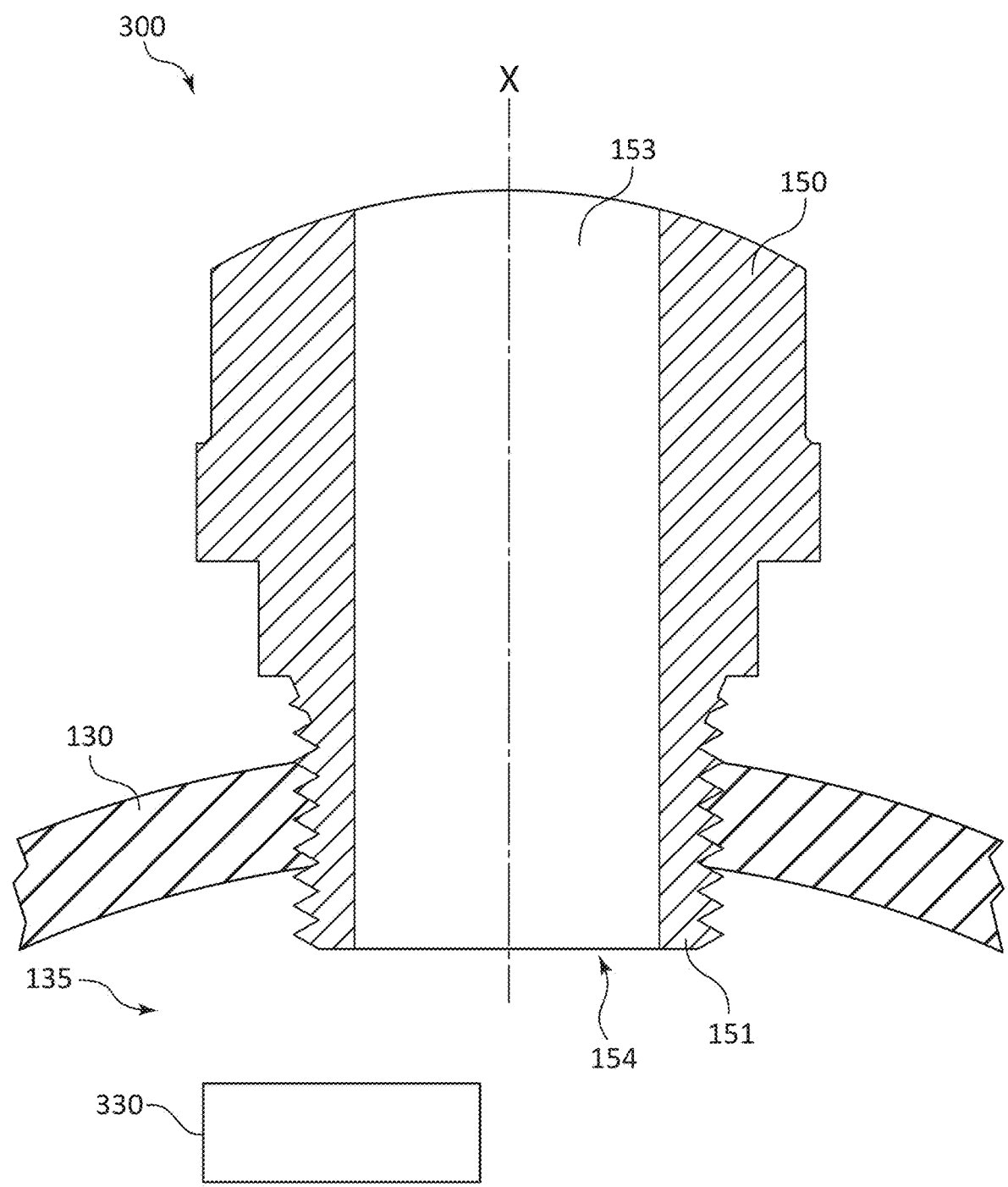
FIG. 3A-3E illustrates exemplary embodiments of a method for reinforcing a coupling between a valve of a conduit and a host pipe lined with a liner.
Figure 10A:
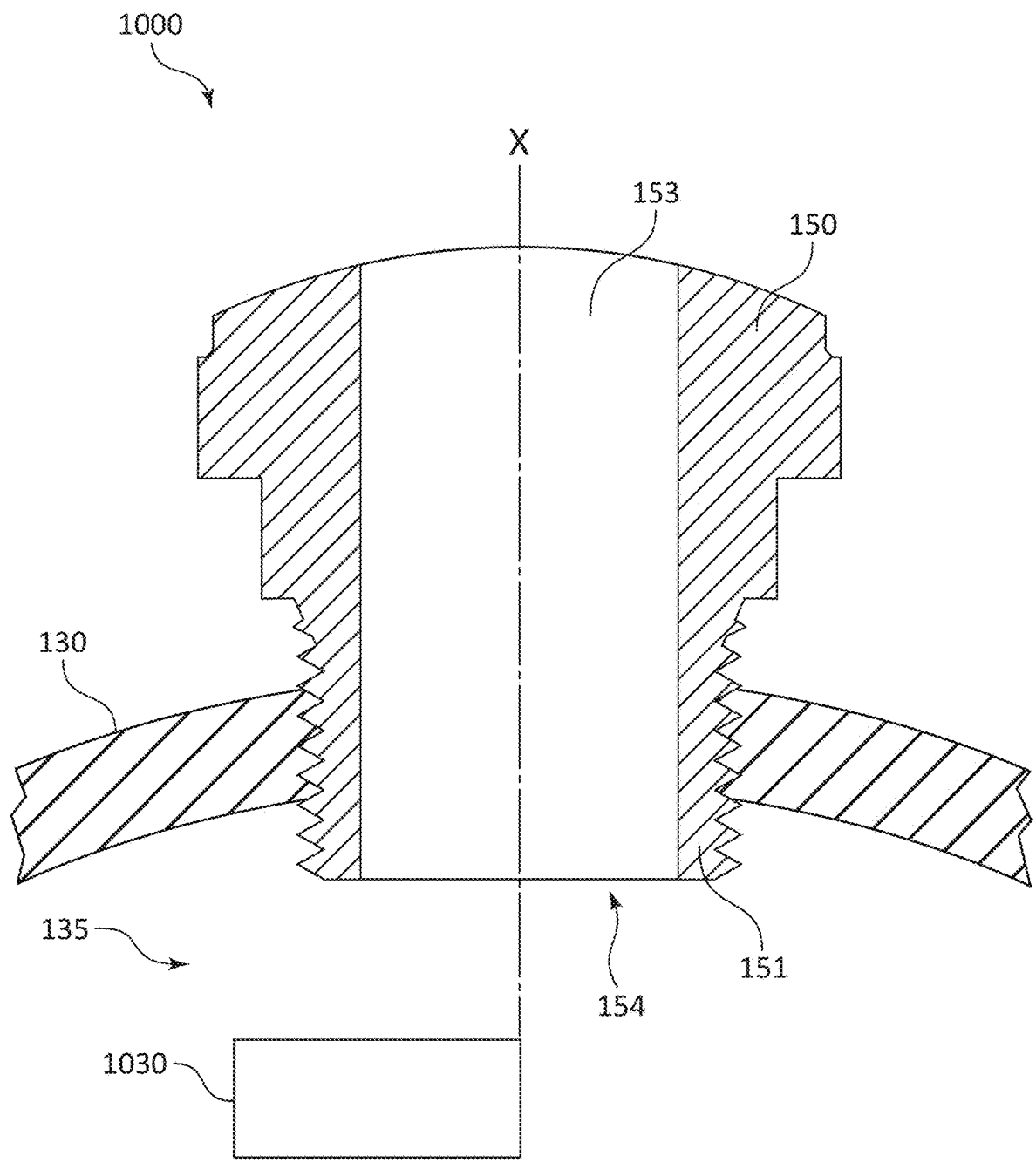
FIG. 10A-10E illustrates exemplary embodiments of a method for reinforcing a coupling between a valve of a conduit and a host pipe lined with a liner.

FIGS. 3A and 10A illustrate steps 301 of method 300 and 1001 of method 1000, respectively. Steps 301, 1001 illustrate a host pipe, e.g., host pipe 130, and a valve, e.g., valve 150, that connects host pipe 130 to a conduit pipe (not shown). In some embodiments, internal passageway 135 of host pipe 130 and internal passageway 153 of valve 150 may be connected at an opening 154 of valve 150 such that fluid or other matter may be communicated between host pipe 130 and valve 150. In some embodiments, a portion of valve 150 at opening 154 that extends into internal passageway 135 of host pipe 130 may be damaged. In such embodiments, steps 301, 1001 may include an optional step of grinding down the damaged portion of valve 150. In some embodiments, a robot, e.g., robot 330, 1030, may use a grinder or other grinding tool to grind down the damaged portion of valve 150. In some embodiments, grinding the damaged portion of valve 150 may include grinding down axial surface 151 of valve 150 to a flat or smooth profile that is substantially parallel with an axial surface 215, 269 of service sleeve 210, 260 to help ensure that a seal is formed between axial surface 151 of valve 150 and axial surface 215, 269 of service sleeve 210, 260 when cork assembly 310, 1010, which includes service sleeve 210, 260, is installed into valve 150 (see step 302, 1002 at FIGS. 3B and 10B, respectively).

In some embodiments, steps 301, 1001 may further include draining host pipe 130 of its contents, with may include fluids, solids, or gases.

Figure 3B:
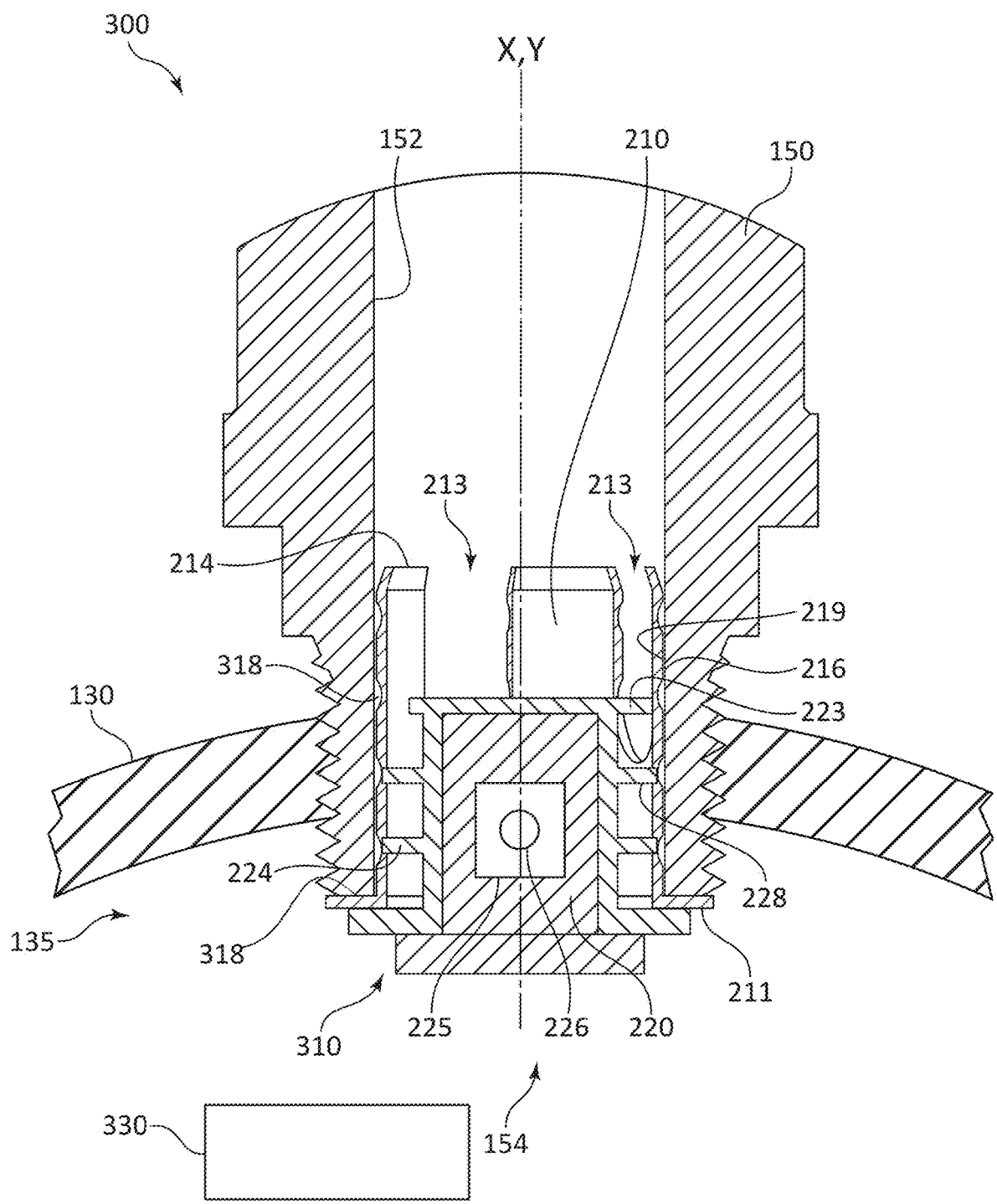
Figure 10B:
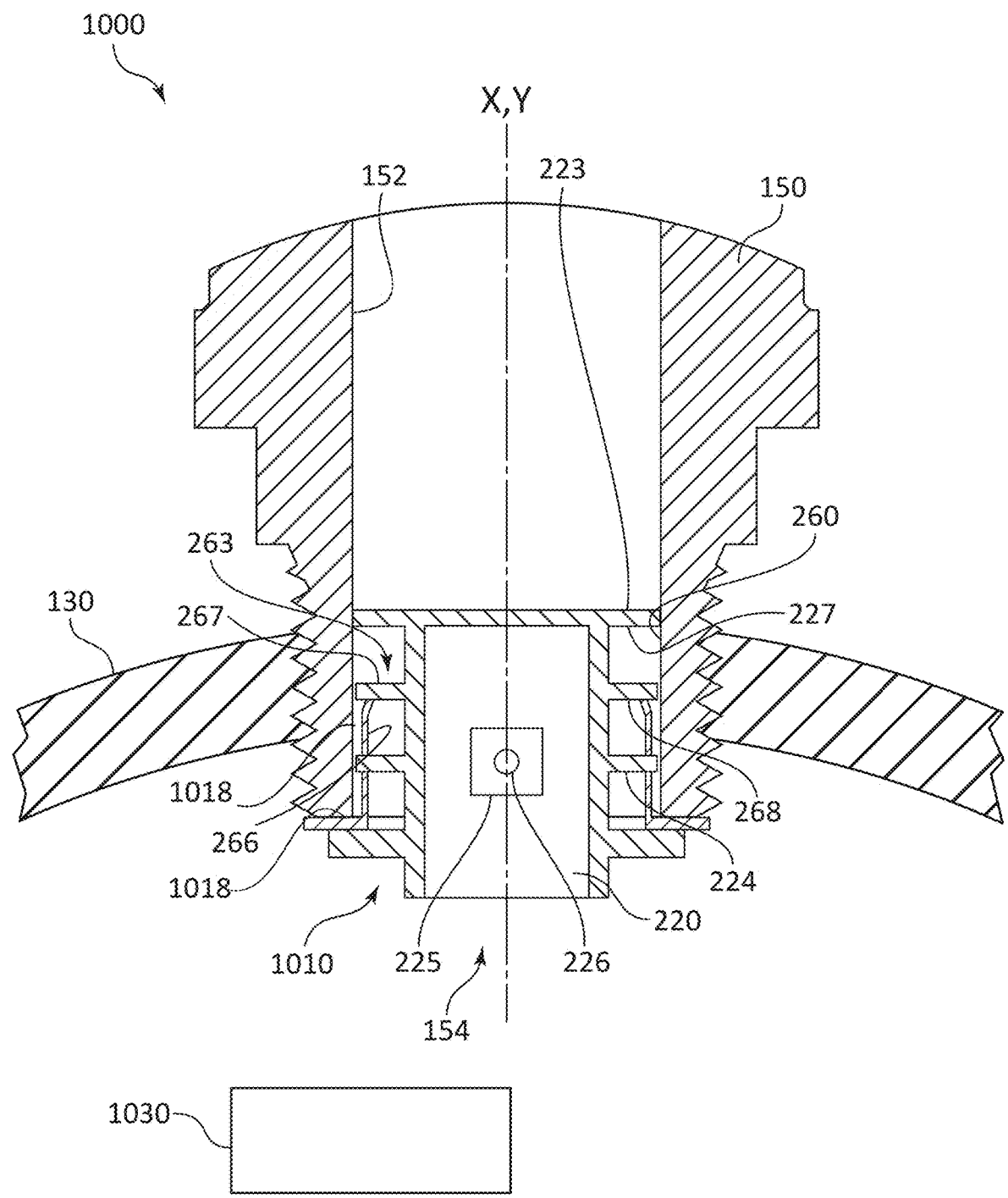

FIGS. 3B and 10B illustrate a step 302 of method 300 and step 1002 of method 1000, respectively. At step 302, 1002, a cork assembly 310, 1010 may be installed in valve 150 by inserting cork assembly 310, 1010 into internal passageway 153 of valve 150 from an interior of internal passageway 135 of host pipe 130. In some embodiments, cork assembly 310 may include a service sleeve, e.g., service sleeve 210, and a cork, e.g., cork 220 inserted within an interior of service sleeve 210, and cork assembly 1010 may include a service sleeve, e.g., service sleeve 260 and cork 220 inserted within an interior of service sleeve 260. In some embodiments, cork assembly 310, 1010 may be pre-assembled by a user before performing steps 302, 1002.

In some embodiments, an adhesive, e.g., adhesive 318, 1018, may be applied to outer surface 216, 265 of service sleeve 210, 260 before cork assembly 310, 1010 is installed into valve 150 to adhere service sleeve 210, 260 to interior surface 152 of valve 150. In some embodiments, a user may apply adhesive 318, 1018, to outer surface 216, 265 of service sleeve 210, 260 by, for example, brushing the outer surfaces with adhesive with a uniform layer of adhesive. In some embodiments, a curing time of adhesive 318, 1018 may be long enough to install cork assembly 310, 1010 into valve 150 so that adhesive 318, 1018 cures once cork assembly 310, 1010 is installed within internal passageway 153 of valve 150 so that adhesive 318, 1018 may adhere service sleeve 210, 260 to interior surface 152 of valve 150, but short enough such that cork assembly 310, 1010 may be installed before adhesive 318, 1018 begins to drip off of outer surface 216, 265 and form a non-uniform bond with interior surface 153 once installed into valve 150. In some embodiments, a curing time of adhesive 318, 1018 may be approximately 20 minutes to ensure a proper, uniform bonding of outer surface 216, 265 and interior surface 153. While described herein as being applied to outer surface 216, 265 by a brushing the outer surfaces, it will be appreciated by one of ordinary skill in the art that adhesive 318, 1018 may be applied to outer surface 216, 265 of service sleeve 210, 260 by any known process, automated or manual.

In some embodiments, installing 302, 1002 cork assembly 310, 1010 into valve 150 may include inserting cork assembly 310, 1010 into opening 154 of valve 150 from internal passageway 135 of host pipe 130 until axial surface 215, 269 of flange 211, 261 of service sleeve 210, 260 abuts axial surface 151 of valve 150. In some embodiments, cork assembly 310, 1010 may be installed in valve 150 by a robotic device or other remote controlled device, e.g., robot 330, 1030. In such embodiments, robot 330, 1030 may use an installing tool to install cork assembly 310, 1010 in valve 150 through opening 154.

In embodiments using service sleeve 210 with one or more cutouts 213, e.g., method 300, each radial appendage of one or more radial appendages 223 of cork 220 may align with and extend radially through each cutout of one or more cutouts 213 of service sleeve 210. In some embodiments, an outer radius of each radial appendage 223, measured from an outer radial end of each radial appendage to axis Y, may be larger than an inner radius of engaging end 214 of service sleeve 210, measured from an inner surface of engaging end 214 and axis Y, such that each radial appendage 223 extends radially beyond outer surface 216 of cylindrical housing 212 of service sleeve 210. By extending beyond outer surface 216 of cylindrical housing 212, each radial appendage 223 may contact interior surface 152 of valve 150 when cork assembly 310 is inserted into valve 150 and create a gap between interior surface 152 and outer surface 216 of cylindrical housing 212 of service sleeve 210. Presence of this gap between interior surface 152 and outer surface 216 prevents contact between outer surface 216 of cylindrical housing 216 of service sleeve 210 and interior surface 152 of valve 150 and thus reduces the potential for damage to service sleeve 210 during installation of step 302. Furthermore, by creating this gap between interior surface 152 and outer surface 216, adhesive 318 applied to outer surface 216 before cork assembly 310 is installed may form a barrier between interior surface 152 and outer surface 216 to ensure that there is no contact between the two surfaces. Once cork assembly 310 is installed, adhesive 318 may dry and adhere outer surface 216 of service sleeve 210 to interior surface 152 of valve 150, securing service sleeve 210 to valve 150 without the need for any contact between outer surface 216 and interior surface 152.

In some embodiments, radial appendages 223 may help guide cork assembly 310 into internal passageway 153 of valve 150 and center cork assembly 310 therein such that axis of symmetry X of valve 150 substantially aligns with axis of symmetry Y of service sleeve 210.

Furthermore, aligning each radial appendage 223 with each cutout 213 helps ensure cork 220 remains within service sleeve 210 during installation of cork assembly 310 into valve 150 at step 302. As discussed above, in embodiments where radial appendages 213 extend radially beyond outer surface 216 of cylindrical housing 212, they may contact interior surface 152 of valve 150. Thus, when cork assembly 310 is installed into valve 150, there may be a friction force between interior surface 152 and radial appendages 224 that is resisting cork 220 from being inserted into valve 150. However, the same friction force does not exist to resist insertion of service sleeve 210 into valve 150 because outer surface 216 of cylindrical housing 212 does not contact interior surface 152. Thus, when cork assembly 310 is installed, service sleeve 210 may be inserted into valve 150 while insertion of cork 220 is resisted due to this friction force, creating an effect where cork 220 appears to be "falling out of" service sleeve 210. However, because radial appendages 223 extend through cutouts 213 and beyond outer surface 216, a contact between an axial surface 227 of each radial appendages 223 and an axial surface 218 of each cutout 213 prevents cork 220 from "falling out of" service sleeve 210. This allows for the use of adequate force in installation of cork assembly 310 to overcome the friction force resisting insertion of cork 220 into valve 150 without cork 220 falling out of service sleeve 210.

In some embodiments, cork 220 and service sleeve 210 may be secured together by an interference between the one or more intermediate flanges 224 of cork 220 and an interior surface 219 of service sleeve 210.

In embodiments using service sleeve 260 without one or more cutouts, e.g., method 1000, cork 220 may be secured into service sleeve 260 by interference fit between an engaging end 263 of service sleeve 260 and axial surface 227 of radial appendages 223. In such embodiments, an inner radius of engaging end 263, which may be measured from interior surface 266 of service sleeve 260 at engaging end 263 to axis Y, may be less than the outer radius of radial appendages 223 such that radial appendages 223 extend radially further than interior surface 266 of service sleeve 260, and axial surface 227 of one or more radial appendages 223 axially abuts axial end face 267 of engaging end 263.

In some embodiments, radial appendages 223 of cork 220 may extend radially beyond outer surface 265 of service sleeve 260 such that radially appendages 223 may make contact with interior surface 152 of valve 150, as seen in FIG. 10B. By extending radially further than outer surface 265 of service sleeve 260 so as to make contact with interior surface 152 of valve 150, radial appendages 223 may prevent contact between outer surface 265 of service sleeve 260 interior surface 152 of valve 150 when cork assembly 1010 is inserted into valve 150. This also creates a gap between outer surface 265 and interior surface 152. In some embodiments, an adhesive 1018 may be applied to outer surface 265 before cork assembly 1010 is installed into valve 150. In some embodiments, because radial appendages 223 contact interior surface 152 and ensure that outer surface 265 does not contact interior surface 152 of valve 150, adhesive 1018 may fill the gap created between outer surface 265 and interior surface 152 and dry after cork assembly 1010 is installed to adhere outer surface 265 to interior surface 152. In this way, service sleeve 260 may be secured inside valve 150 without contacting interior surface 152 of valve 150. Furthermore, radial appendages 223 may help guide cork assembly 1010 into internal passageway 153 of valve 150 and center cork assembly 1010 therein such that axis of symmetry X of valve 150 substantially coincides with axis of symmetry Y of service sleeve 260.

In some embodiments, cork 220 and service sleeve 260 may be secured together by an interference between one or more intermediate flanges 224 of cork 220 and an interior surface 266 of service sleeve 260.

In some embodiments, cork 220 may be positioned axially within a service sleeve, e.g., service sleeve 210 or service sleeve 260, such that an engaging end of the service sleeve, e.g., engaging end 214 of service sleeve 210 or engaging end 263 of service sleeve 260, and an axial surface 228 of an intermediate flange of the one or more intermediate flanges 224 axially abut. In such embodiments, an outer radius of intermediate flange 224, which may be measured from an outer radial surface of an intermediate flange 224 to axis Y, may be greater than the inner radius of the engaging end of the service sleeve, e.g., the inner radius of engaging end 214 or the inner radius of engaging end 263. In such embodiments, radial appendages 223 may still extend radially further than outer surface 216, 265 of service sleeve 210, 260 and abut interior surface 152 of valve 150, creating the gap between outer surface 216, 265 of service sleeve 210, 260 that may be filled by adhesive 318, 1018 to adhere and secure service sleeve 210, 260 to interior surface 152 of valve 150 without any contact between interior surface 152 of valve 150 and outer surface 216, 265 of service sleeve 210, 260.

In some embodiments, step 302 of installing cork assembly 310 into internal passageway 153 of valve 150 may include inserting cork assembly 310 into internal passageway 153 until an axially inner surface 215 of flange 211 of service sleeve 210 abuts an axial surface 151 of valve 150. In some embodiments, axial surface 151 of valve 150 may be positioned within internal passageway 135 of host pipe 130, in which annular flange 211 of service sleeve 210 may also be positioned within internal passageway 135 when cork assembly 310 is installed in valve 150. In some embodiments, an abutment between axially inner surface 215 of flange 211 of service sleeve 210 and axial surface 151 of valve 150 may form a seal therewith. In some embodiments, adhesive 318 may also be applied to axially inner surface 215 of flange 211 to adhere service sleeve 210 to axial surface 151 of valve 150 and improve the seal formed therewith.

Step 1002 of installing cork assembly 1010 into internal passageway 153 of valve 150 may include inserting cork assembly 1010 into internal passageway 153 until an axially inner surface 269 of flange 261 of service sleeve 260 abuts an axial surface 151 of valve 150. In some embodiments, axial surface 151 of valve 150 may be positioned within internal passageway 135 of host pipe 130, in which annular flange 261 of service sleeve 260 may also be positioned within internal passageway 135 when cork assembly 1010 is installed in valve 150. In some embodiments, an abutment between axially inner surface 269 of flange 261 of service sleeve 260 and axial surface 151 of valve 150 may form a seal. In some embodiments, adhesive 1018 may also be applied to axially inner surface 269 of flange 261 to adhere service sleeve 260 to axial surface 151 of valve 150 and improve the seal formed therewith.

In some embodiments, adhesive 318, 1018 may be A61 acrylic adhesive or any adhesive that meets NSF/ANSI Standard 61 for drinking water system components.

Figure 3C:
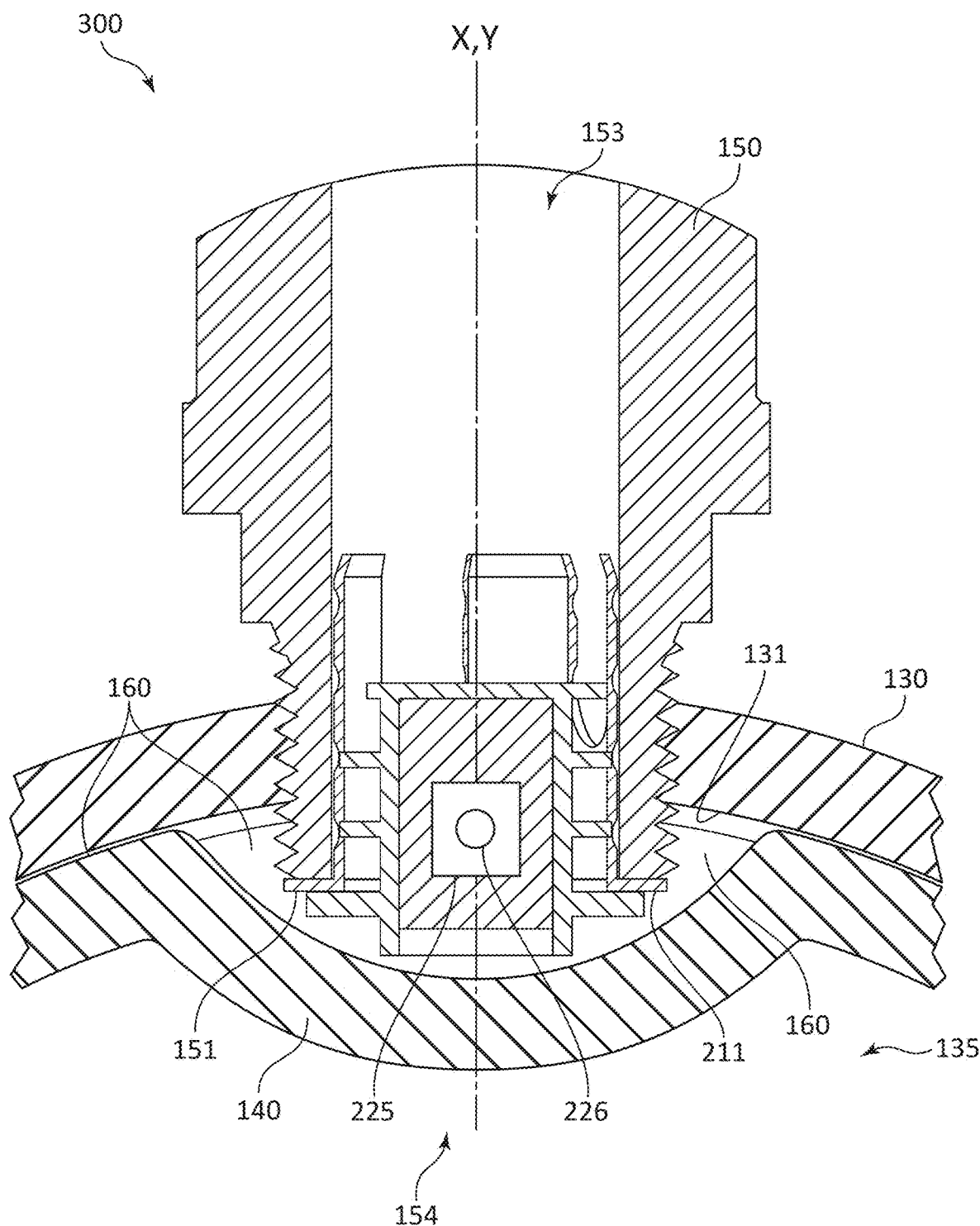
Figure 10C:
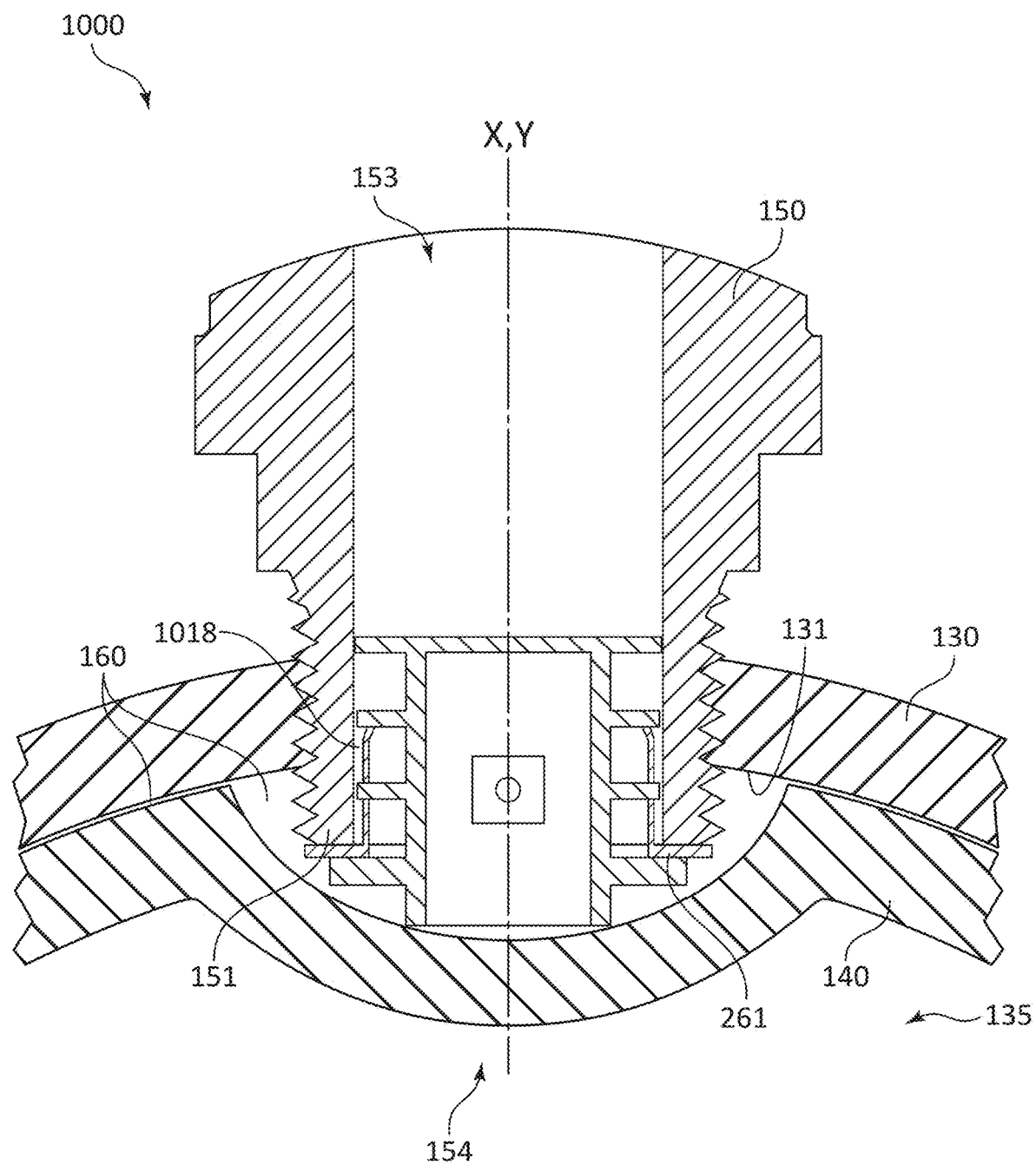

As illustrated at FIGS. 3C and 10C, respectively, at step 303, 1003, a liner may be installed into a host pipe. In some embodiments, installing a liner into a host pipe may include inserting liner 140 into internal passageway 135 of host pipe 130 such that liner 140 lines interior surface 131 of internal passageway 135 of host pipe 130. In some embodiments, a layer of epoxy, e.g., layer of epoxy 160, may be applied to liner 140 before liner 140 is installed into host pipe 130, and epoxy 160 may then bond interior surface 131 to liner 140. Advantageously, because flange 211, 261 of service sleeve 210, 260 forms a seal with axial surface 151 of valve 150, epoxy 160 is prevented from entering valve 150 when liner 140 is installed into host pipe 130.

When installed, liner 140 may cover up cork assembly 310, 1010 at flange 211, 261 of service sleeve 210, 260 and axial surface 151 of valve 150 such that internal passageway 153 of 150 valve and internal passageway 135 of host pipe 130 are no longer connected. In other words, when liner 140 is initially installed, there may be no fluid communication between valve 150 and host pipe 130 at opening 154.

In some embodiments, epoxy 160 may be injected between an inner and outer jacket (not illustrated) of liner 140 before liner 140 is installed into host pipe 130. In such embodiments, once liner 140 has been installed into host pipe 130, pressure may be applied to inner surface 141 of liner 140 from within internal passageway 135 of host pipe 130 and within liner 140, causing epoxy 160 to move though the outer jacket and form a bond between interior surface 131 of host pipe 130 and liner 140.

Figure 3D:
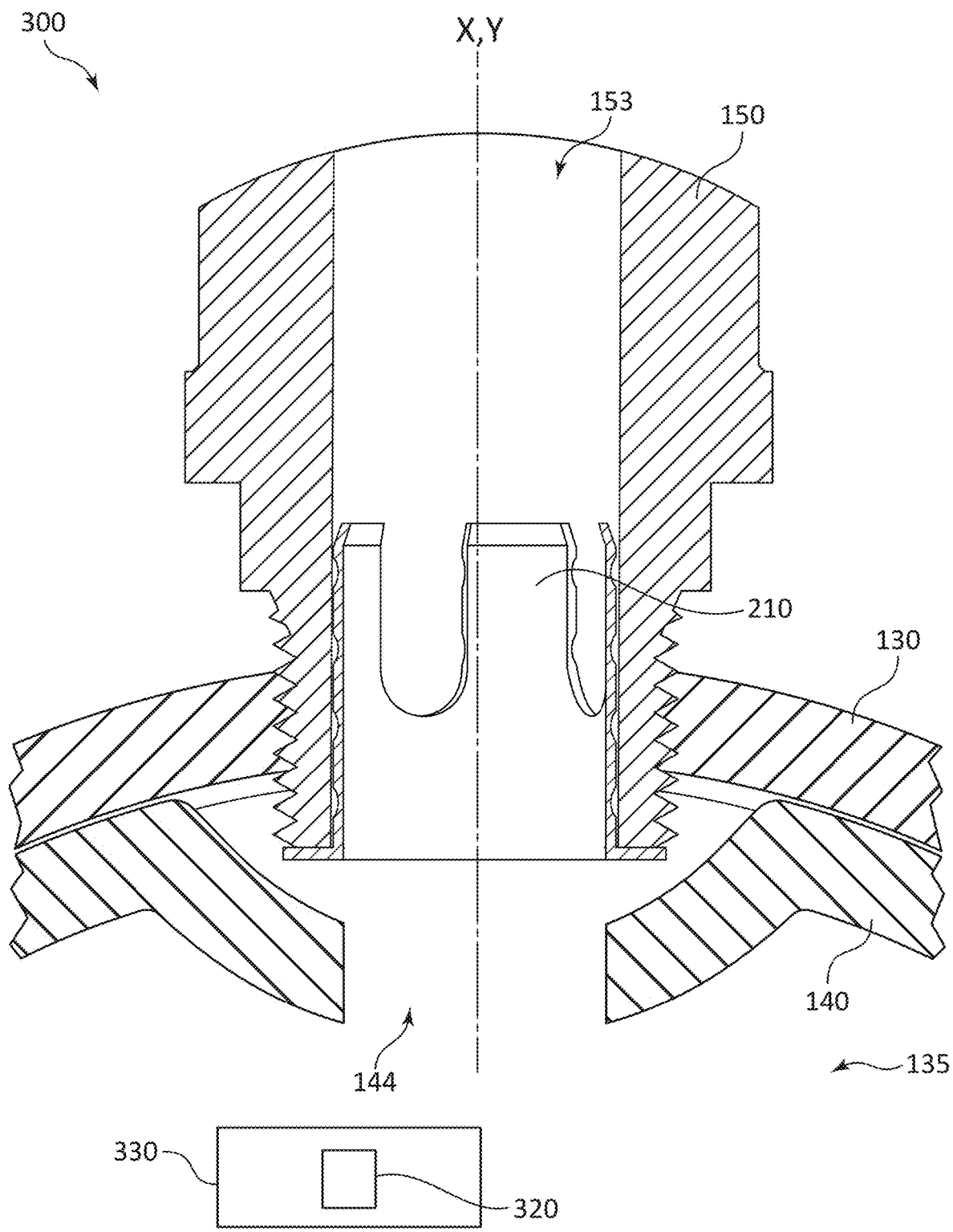
Figure 10D:
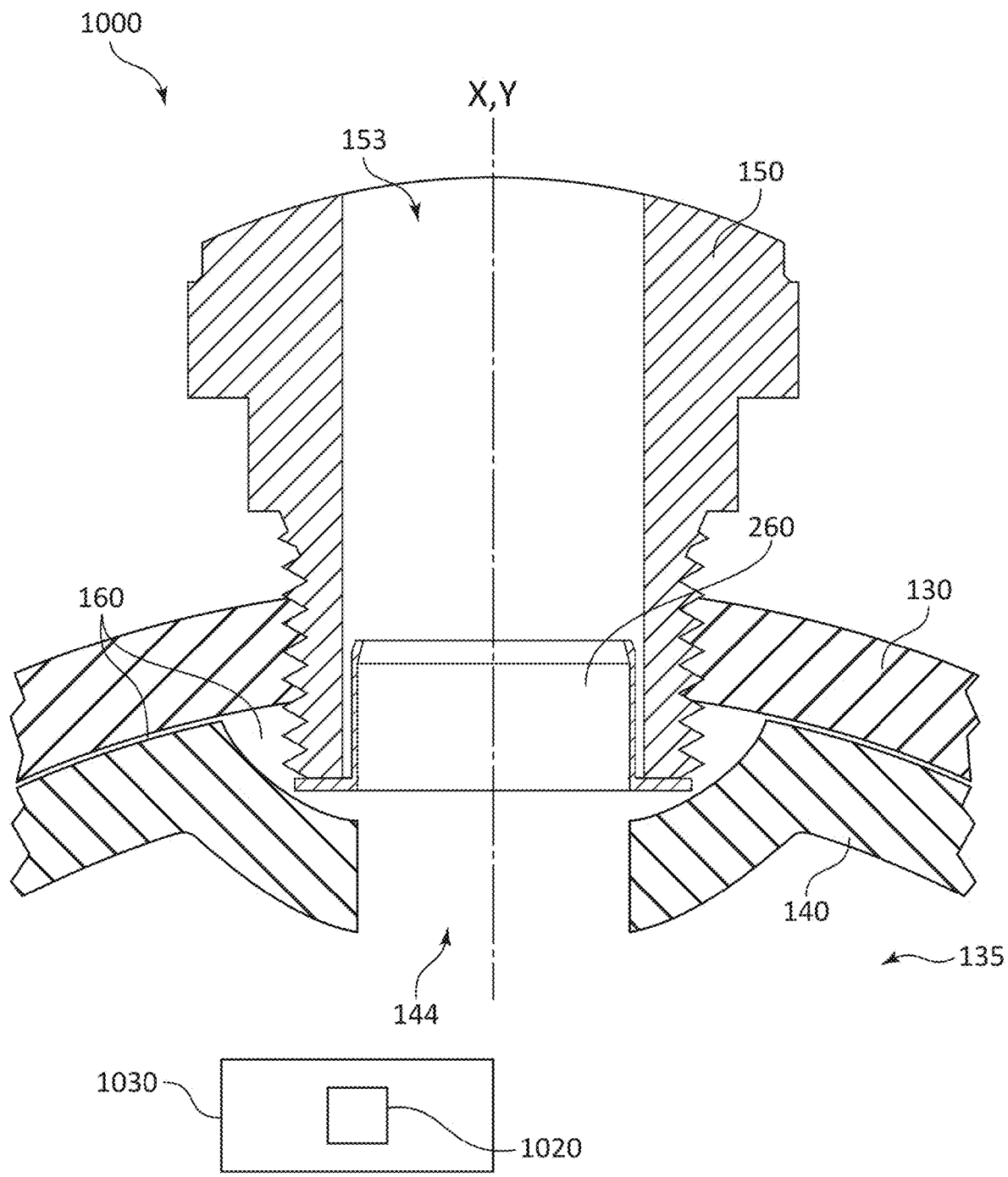

Illustrated in FIGS. 3D and 10D are step 304 of method 300 and steps 1004 of method 1000, respectively. At step 304, 1004, a cork may be removed from the cork assembly. In some embodiments, removing cork 220 from cork assembly 310, 1010 may include using a drill to drill through liner 140 at opening 154 of valve 150 and drilling through cork 220. This may destroy cork 220, causing it to be removed from within service sleeve 210, 260. When cork 220 is drilled out of cork assembly 310, 1010, service sleeve 210, 260 remains installed within internal passageway 153 of valve 150 (i.e., service sleeve 210, 260 is not removed). In some embodiments, debris of cork 220 after it has been drilled out may be flushed out with water or another liquid. In some embodiments, the debris may be flushed out from an end of internal passageway 153 distal to opening 154.

In some embodiments, removing cork 220 from cork assembly 310, 1010 may include detecting a location of first magnetic element 225 of cork assembly 310, 1010 from within internal passageway 135 of host pipe 130. In some embodiments, detecting a location of cork assembly 310, 1010 may include introducing a second magnetic element 320, 1020 into internal passageway 135 that, when in a vicinity of cork 220, causes at least one light source 226 of first magnetic element 225 of cork 220 to illuminate. In some embodiments, at least one light source 226 of first magnetic element 225 may illuminate when second magnetic element 320, 1020 is within range of first magnetic element 225. In other embodiments, at least one light source 226 of first magnetic element 225 may illuminate when second magnetic element 320, 1020 is within about 2 inches of first magnetic element 225. In some embodiments, a robot or other remote controlled device may be used to introduce second magnetic element 320, 1020 to internal passageway 135 and detect the location of first magnetic element 225. When illuminated, at least one light source 226 of magnetic element 225 may cause cork 220 to be visible through liner 140 from internal passageway 135 of host pipe 130, revealing the location of first magnetic element 225 and cork 220. A hole or other opening, e.g., opening 144, may be drilled through liner 140 at the location of first magnetic element 225 and cork 220 may be removed from cork assembly 310, 1010 through opening 144.

In some embodiments, a robot or other remote controlled device, e.g., 330, 1030, may use a drill or other drilling tool to drill opening 144 through liner 140 and drill out cork 220 from cork assembly 310, 1010. In some embodiments, step 304, 1004 may further include robot 330, 1030 flushing out debris from internal passageway 153 of valve 150 after cork 220 has been drilled out of cork assembly 310, 1010.

In embodiments in which the service sleeve of cork assembly 310 has one or more cutouts, e.g., service sleeve 210, cork 220 may be removed from cork assembly 310 by pulling cork 220 out of service sleeve 210 with force sufficient to overcome the interference between axial surface 217 of each cutout 213 and axial surface 227 of each radial appendage 223. In such embodiments, each radial appendage may bend axially away from flange 221. Alternatively, in embodiments in which each radial appendage 223 does not align with each cutout 213, cork 220 may be removed by pulling cork out of cork assembly 310 with force sufficient to overcome the force exerted by each radial appendage 223 against interior surface 219 of service sleeve 210.

In embodiments in which the service sleeve of cork assembly 1010 has no cutouts, e.g., service sleeve 260, cork 220 may be removed from cork assembly 1010 by pulling cork 220 out of service sleeve 260 with force sufficient to overcome the interference between axial end face 267 of engaging end 263 of service sleeve 260 and axial surface 227 of each radial appendage 223 of cork 220.

In still further embodiments, cork may be removed from a cork assembly 310, 1010 by pulling cork 220 out of the service sleeve, e.g., service sleeve 210, 260, with force sufficient to overcome the interference between inner axial surface 228, 266 of an intermediate flange 224 of cork 220 and an engaging end, e.g., engaging end 214, 263

In some embodiments a radial thickness of service sleeve 210, 260 may be no less than 0.5 mm in order to maintain a sufficient rigidity of service sleeve 210, 260 in order to maintain a sufficient strength to resist damage and breakage caused during the drilling-out of cork 220 at step 304, 1004. Furthermore, a radial thickness of service sleeve 210, 260 may configured so as to substantially reduce a diameter of internal passageway 153 at opening 154, and not substantially restrict the flow of fluid from internal passageway 135 and affect pressure downstream of valve 150.

Figure 3E:
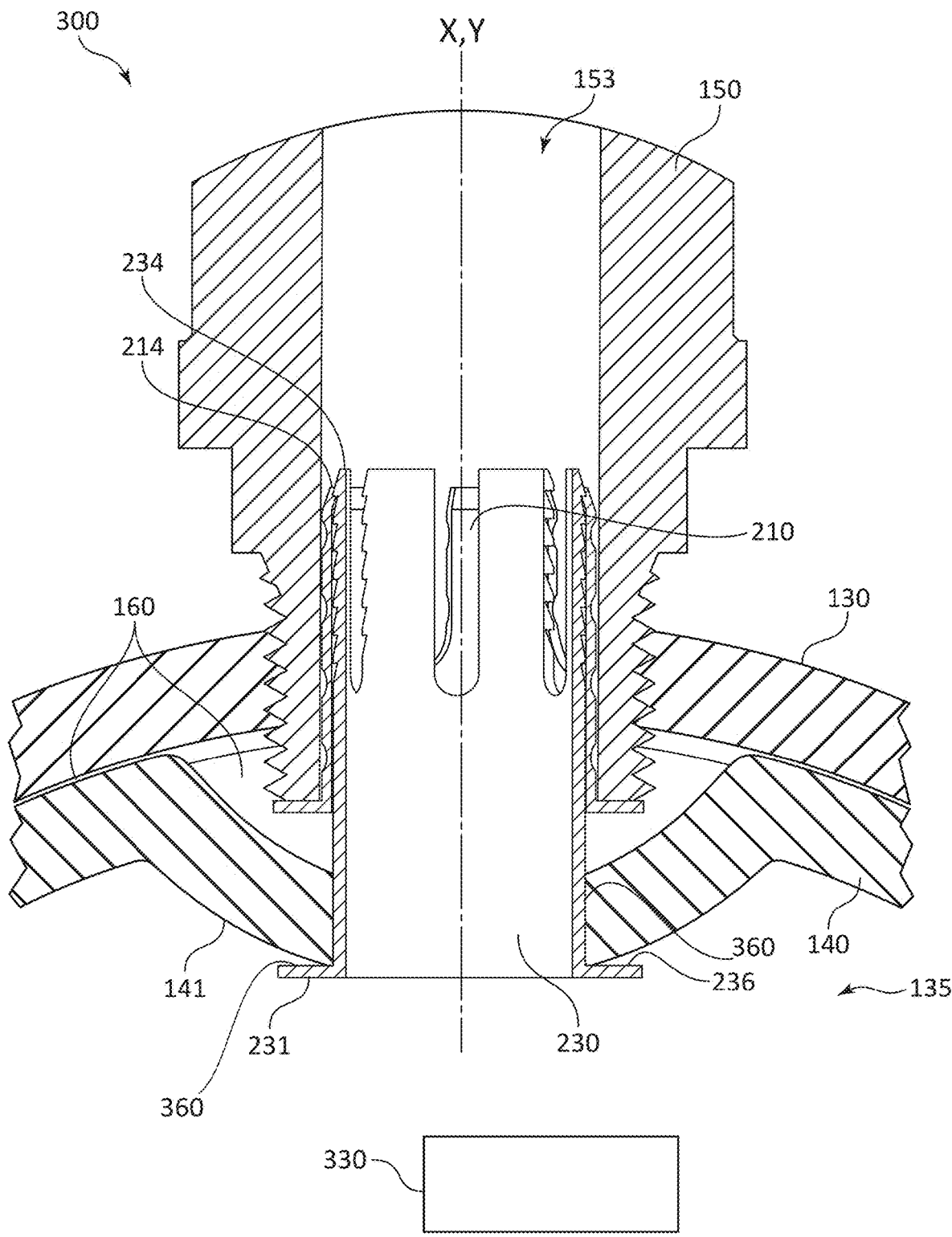
Figure 10E:
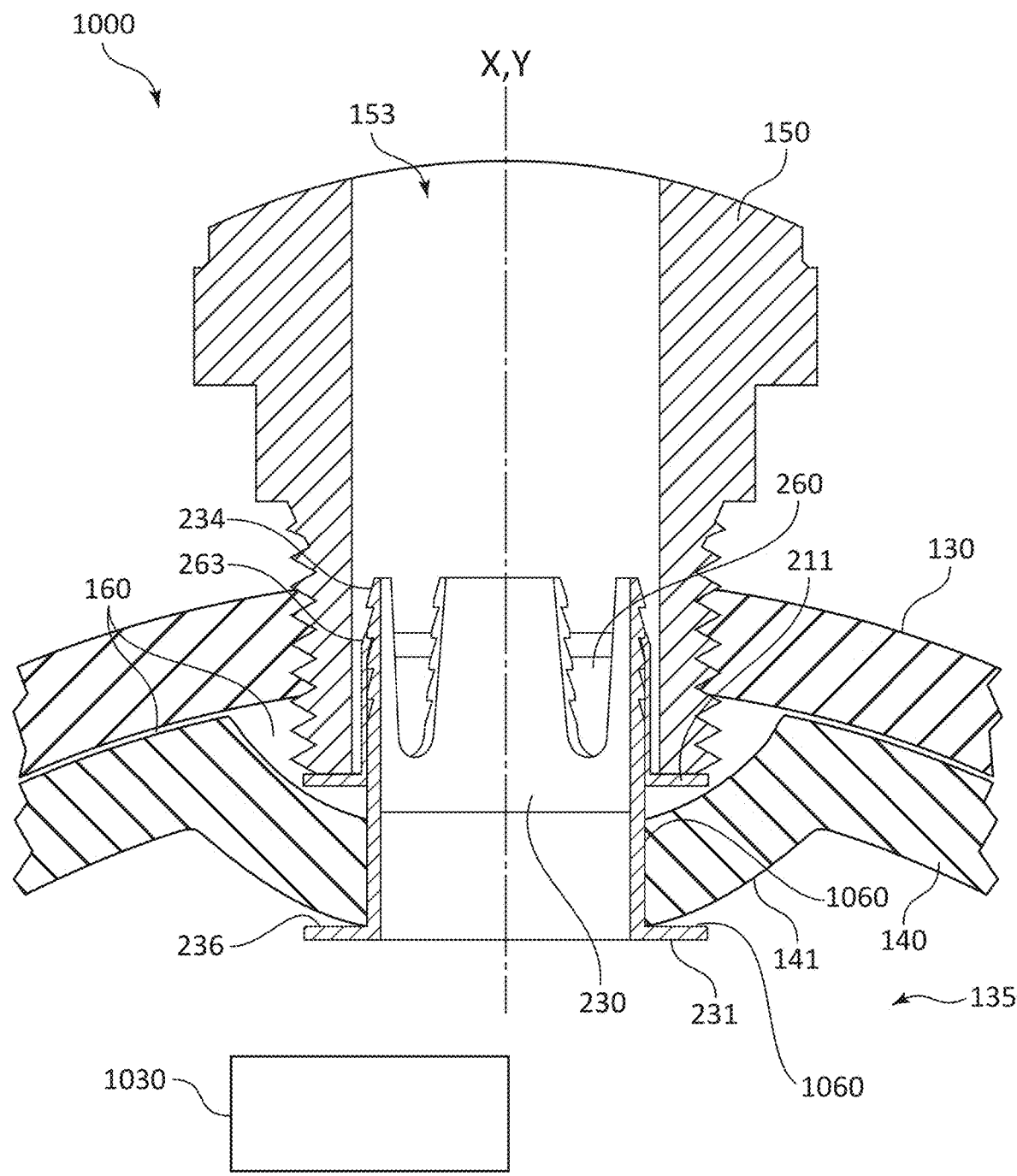

FIGS. 3E and 10E illustrate step 305 of method 300 and step 1005 of method 1000, respectfully. At step 305, 1005, a reinforcing sleeve may be installed into the service sleeve. In some embodiments, installing a reinforcing sleeve into the service sleeve may include inserting reinforcing sleeve 230 into an interior of service sleeve 210, 260. Reinforcing sleeve 230 may be inserted into service sleeve 210, 260 such that axial surface 236 of flange 231 of reinforcing sleeve 230 abuts or is adjacent to inner surface 141 of liner 140 and forms a fluid-tight seal therewith. In this way, liner 140 may be sandwiched between flange 211, 261 of service sleeve 210, 260 and flange 231 of reinforcing sleeve 230, and service sleeve 210, 260 and reinforcing sleeve 230 connect internal passageway 153 of valve 150 with internal passageway 253 of host pipe 130 lined with liner 140.

In some embodiments, interference between flange 231 of reinforcing sleeve 230 and interior surface 141 of liner 140 may prevent axial movement of reinforcing sleeve 230 further into internal passageway 153 of valve 150. Further, reinforcing sleeve 230 may be inserted into service sleeve 210, 260 such that an annular ratchet 234 of reinforcing sleeve 230 engages with engaging end 214, 263 of service sleeve 210, 260. By way of this engagement between engaging end 214, 263 and annular ratchet 234, axial movement of reinforcing sleeve 230 out of internal passageway 153 and into internal passageway 135 of host pipe 130 may be restricted by the interference between engaging end 214, 263 of service sleeve 210, 260 and an engaging surface 235 of annular ratchet 234. Thus, in the assembled configuration of a fitting device assembly shown in FIGS. 3E and 10E, fluid communication is established between internal passageway 135 of host pipe 130 that is lined with liner 140 and internal passageway 153 of valve 150. Now, if host pipe 130 deteriorates in an area covered by liner 140, the fluid connection between internal passageway 153 of 150 and internal passageway 135 of liner 140 is maintained without loss or interruption caused by the deterioration of host pipe 130.

In some embodiments, an adhesive, e.g., adhesive 360, 1060 may be applied to an outer surface 235 of cylindrical housing 232 of reinforcing sleeve 230 axially below one or more annular ratchets 234 to assist with adhering reinforcing sleeve 230 to liner 140 and improve the seal formed between liner 140 and reinforcing sleeve 230. In further embodiments, adhesive 360, 1060 may also be applied to an upper axial surface 236 of flange 231 in order to adhere flange 231 to interior surface 141 of liner 140. In some embodiments, the adhesive may be A61 acrylic adhesive or any adhesive that meets NSF/ANSI Standard 61 for drinking water system components. In some embodiments, adhesive 360, 1060 may be applied by a user any known process, automated or manual, before reinforcing sleeve 230 is installed into valve 150. For example, a user may brush adhesive 360, 1060 on to outer surface 235 of cylindrical housing 232 and to upper axial surface 236 of flange 231 using a brush (not illustrated).

In some embodiments, engaging end 214, 263 of service sleeve 210, 260 may engage with a first annular ratchet of one or more annular ratchets 234 axially closest to the end of reinforcing sleeve distal to flange 231. In other embodiments, engaging end 214, 263 may engage with a second, third, or "Nth" annular ratchet of one or more annular ratchets 234. In such embodiments, step 305, 1005 of installing a reinforcing sleeve in the service sleeve may include inserting reinforcing sleeve 230 into service sleeve 210, 260 until an "Nth" annular ratchet of one or more annular ratchets 234 engages with engaging end 214, 263 of service sleeve 210, 260. This allows reinforcing sleeve 230 to remain secured with service sleeve 210, 260 over time as valve 150 sinks/moves toward host pipe 130 as a result of external forces pushing downward on valve 150. This movement or sinking downward toward host pipe 130 may be perfectly vertical or at an angle. Because service sleeve 210, 260 is adhered to interior surface 152 of valve 150 by adhesive 318, 1018, and in some embodiments to axial surface 151 of valve 150, service sleeve 210, 260 will also sink downward with valve 150 as valve 150 sinks downward toward host pipe 130. As service sleeve 210, 260 sinks downward toward host pipe 130, cylindrical body 232 of reinforcing sleeve 230 may flex inward, allowing engaging end 214, 263 of service sleeve 210, 260 to slide down and engage with the next annular ratchet 234. Furthermore, because liner 140 may be sandwiched between flange 231 of reinforcing sleeve 230 and flange 211, 261 of service sleeve 210, 260, the fluid communication between internal passageway 135 of host pipe 130 lined with liner 140 and internal passageway 153 of valve 150 may be maintained even as valve 150 sinks, thus preventing leaks from valve 150 caused by this sinking.

With reference again to FIG. 1, in some embodiments, each annular ratchet of one or more annular ratchets 234 of reinforcing sleeve 230 may be defined by an outer surface 1240 extending from an axially facing engaging surface 125 of a first annular ratchet to an axially facing engaging surface 125 of a second annular ratchet nearest the first annular ratchet, forming a generally triangular-shape, such as a right triangle. In such embodiments, engaging surface 125 of annular ratchet 234 may abut an axial face 117 of engaging end 214, 263 of service sleeve 210, 260 when reinforcing sleeve 230 is installed into service sleeve 210, 260. In some embodiments, a radial length of a ratchet of one or more annular ratchets 234 measured at engaging surface 125 may be about 0.018 inches. In some embodiments, an angle of inclination of each ratchet of one or more annular ratchets 234 measured from a radially inner boundary of engaging surface 125 and a radially outer boundary of engaging surface 125 may advantageously be substantially equal to the angle at which engaging end 214, 263 of service sleeve 210, 260 is tapered radially inward and to the angle at which inner surface 2141, 2631 and outer surface 2140, 2630 of service sleeve 210, 260 are tapered. This helps improve the security of the engagement between reinforcing sleeve 230 and service sleeve 210, 260 by aligning outer surface 1240 of at least one annular ratchet 234 and inner surface 2141, 2631 of engaging end 214, 263. In various embodiments, an angle of inclination of each ratchet of one or more annular ratchets 234 measured from a radially inner boundary of engaging surface 125 and a radially outer boundary of engaging surface 125 may be approximately 15°. In some embodiments, an axial length of each ratchet of one or more annular ratchets 234 may be about 0.075 inches.

Figure 4:
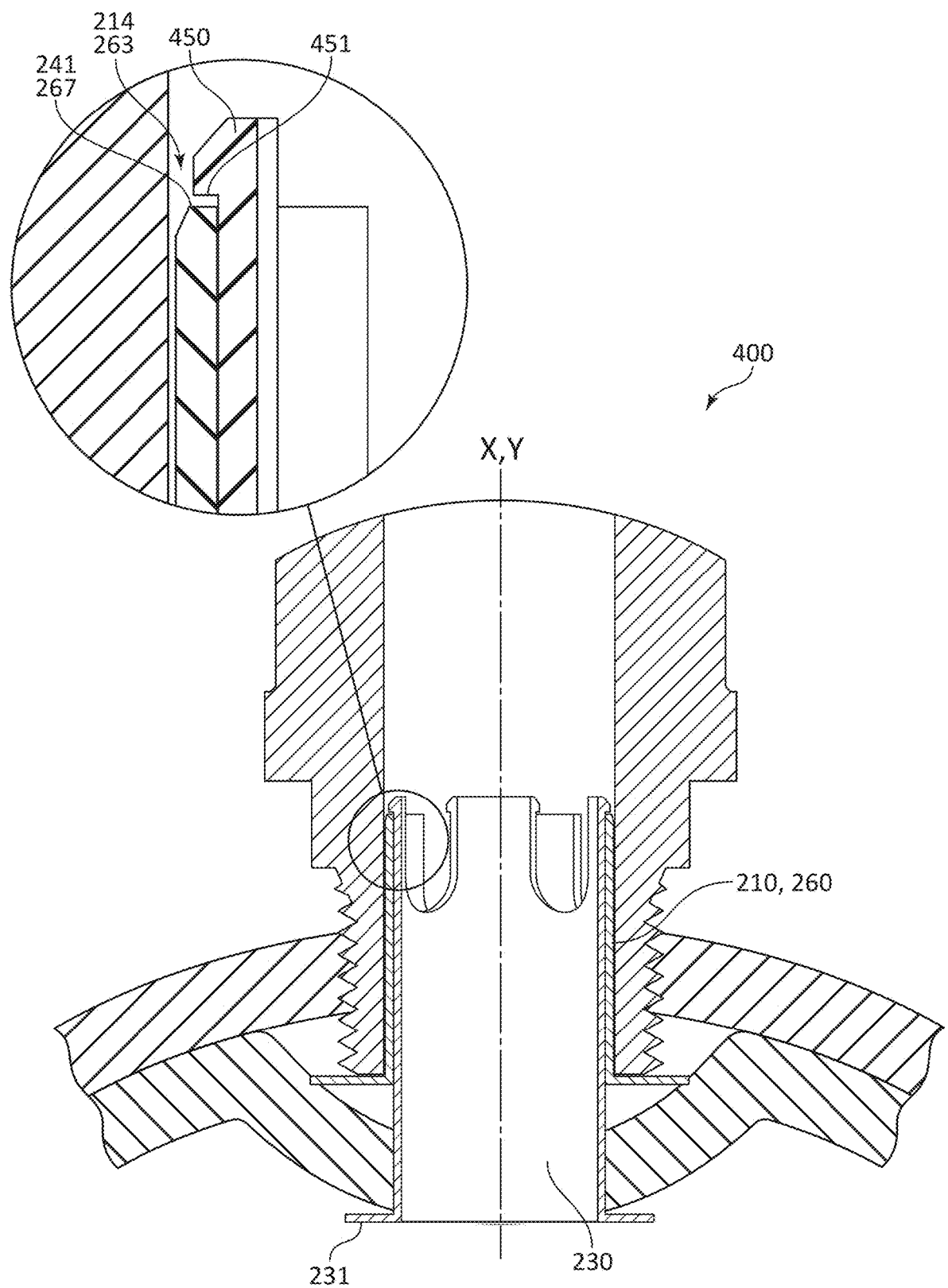
FIG. 4 illustrates a cross section through a service sleeve and a reinforcing sleeve of a fitting device assembly in an installed configuration according to exemplary embodiments of this disclosure.
Figure 5:
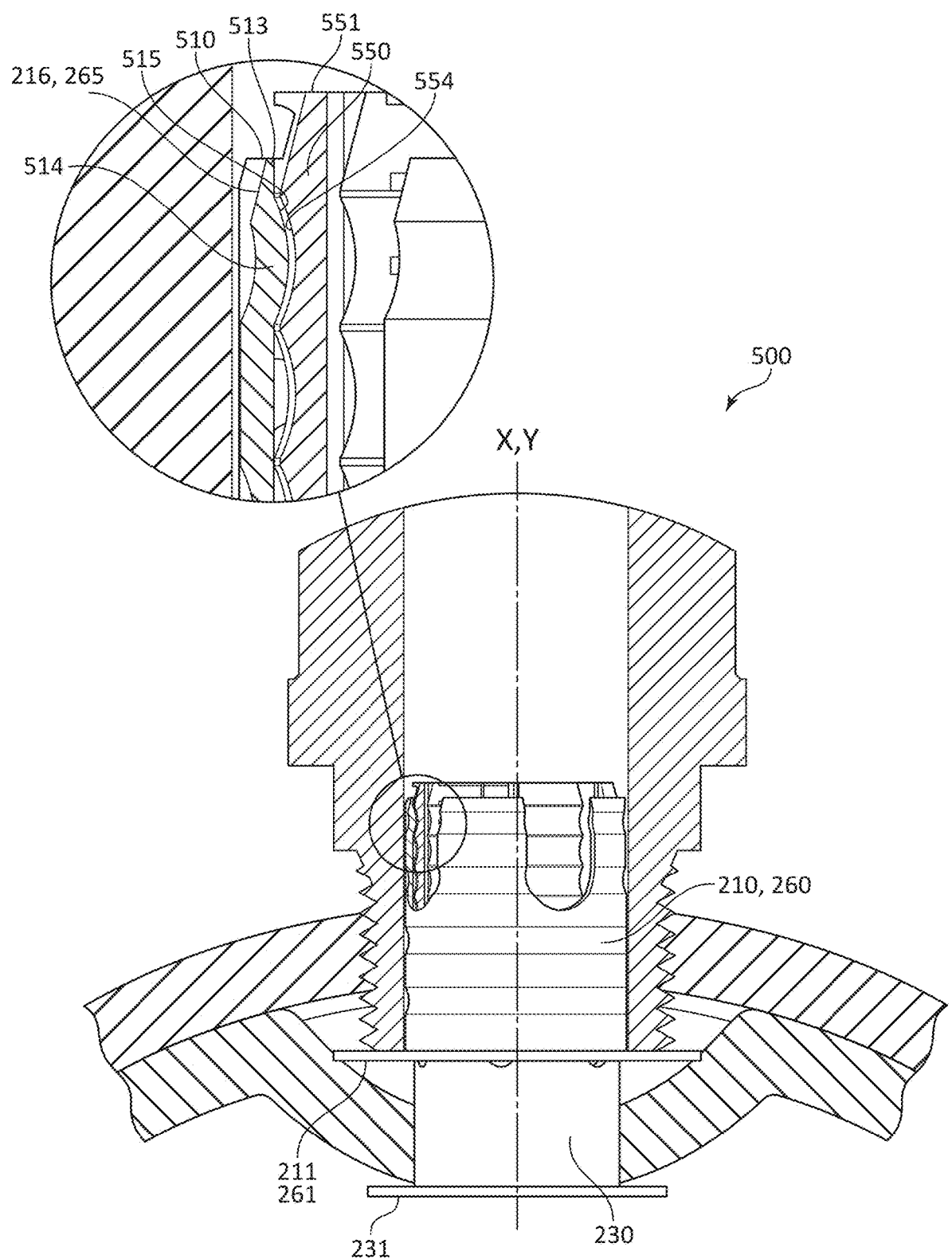
FIG. 5 illustrates a cross section through a service sleeve and a reinforcing sleeve of a fitting device assembly in an installed configuration according to exemplary embodiments of this disclosure.

As illustrated in FIG. 4, some embodiments of a fitting device assembly, e.g., fitting device assembly 400 may include a reinforcing sleeve 230 that may include a single annular ratchet 450 positioned at an end of reinforcing sleeve 230 distal to flange 231. In such embodiments, an axial surface 451 of annular ratchet 450 may abut an axial end face 241, 267 of engaging end 214, 263 of a service sleeve, e.g., service sleeve 210, 260, when reinforcing sleeve 230 is installed into service sleeve 210, 260. This abutment between engaging end 214 and axial surface 451 may help secure reinforcing sleeve 230 and service sleeve 210, 260 together in an installed configuration of fitting device assembly 400.

In some embodiments, annular ratchet 450 of reinforcing sleeve 230 may have an axial length of about 0.050 inches and may taper inward at an angle of approximately 45° at a position about 0.025 inches from axial surface 451 of annular ratchet 450. In some embodiments, axial surface 451 may have a radial length of about 0.015 inches.

In some embodiments, engaging end 214, 263 may be tapered inward at an angle of approximately 15° from a position about 0.019 inches from axial end face 241, 267 to axial end face 241, 267.

In some embodiments, at least one curved member 514 may be curved inward and have an inner radius (i.e., a radius measured from outer surface 216, 265 of service sleeve 210, 260) of about 0.094 inches, an outer radius (i.e., a radius measured from inner surface 219, 266 of service sleeve 210, 260) of about 0.1 inches, and a thickness of about 0.018 inches. In some embodiments, an outer surface 216, 265 of service sleeve 210, 260 may taper inward at an angle of approximately 15° from a position about 0.048 inches from an axial end face 513 of engaging end 510 to axial end face 513 of engaging end 510.

In some embodiments, a radius of at least one curved radial surface 554 of each annular ratchet 550 may be substantially equal to the outer radius of at least one curved member 514 in order to receive at least one curved member 514 in an assembled configuration of fitting device assembly 500. In some embodiments, a distance between an axial end face 551 of engaging end 510 and a center of a curved radial surface 554 axially closest to axial end face 551 may be about 0.125 inches.

Figure 6:
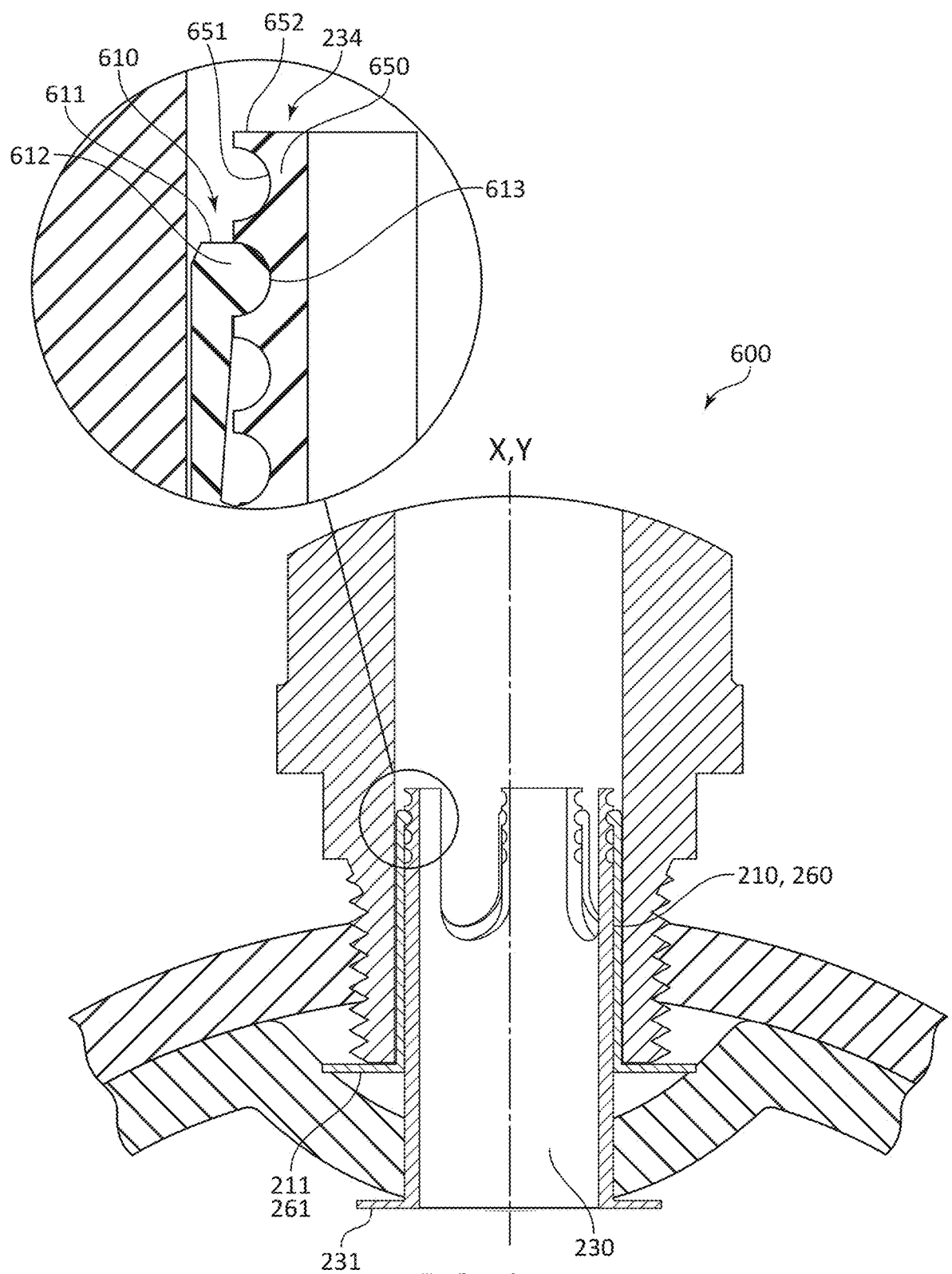
FIG. 6 illustrates a cross section through a service sleeve and a reinforcing sleeve of a fitting device assembly in an installed configuration according to exemplary embodiments of this disclosure.

As illustrated in FIG. 6, some embodiments of a fitting device assembly, e.g., fitting device assembly 600, may include a service sleeve, e.g., service sleeve 210, 260, with a rounded radial projection 612 at an engaging end 610 of service sleeve 210, 260 distal to flange 211, and a reinforcing sleeve 230 that may include at least two annular ratchets 650 that define between them at least one rounded receiving portion 651 at engaging 234 of reinforcing sleeve 230 distal to flange 231. In such embodiments, a rounded receiving portion 651 of the at least one rounded receiving portions 651 may receive rounded radial projection 612 of service sleeve 210, 260 in an installed configuration of fitting device assembly 600 and secure service sleeve 210, 260 together with reinforcing sleeve 230. In some embodiments, service sleeve 210, 260 and reinforcing sleeve 230 may be secured together by a friction fit between a rounded radial surface 613 of rounded radial projection 612 and a rounded receiving surface 652 of rounded receiving portion 651. In some embodiments, a radial thickness of service sleeve 210, 260 may be about 0.05 inches.

In some embodiments, a radius of rounded radial projection 612 may be about 0.025 inches. In some embodiments, engaging end 610 may be tapered inward at an angle of approximately 15° from a position about 0.019 inches from an axial end face 611 to axial end face 611.

In some embodiments, each rounded annular ratchet 650 may have a radius of about 0.025 inches. In some embodiments, each rounded annular ratchet 950 may be spaced about 0.063 inches from each other, as measured from a center of each rounded annular ratchet. In some embodiments an axial end face 652 of engaging end 234 of reinforcing sleeve 230 and a center of a rounded annular ratchet 650 nearest axial end face 652 may be about 0.035 inches.

Figure 7:
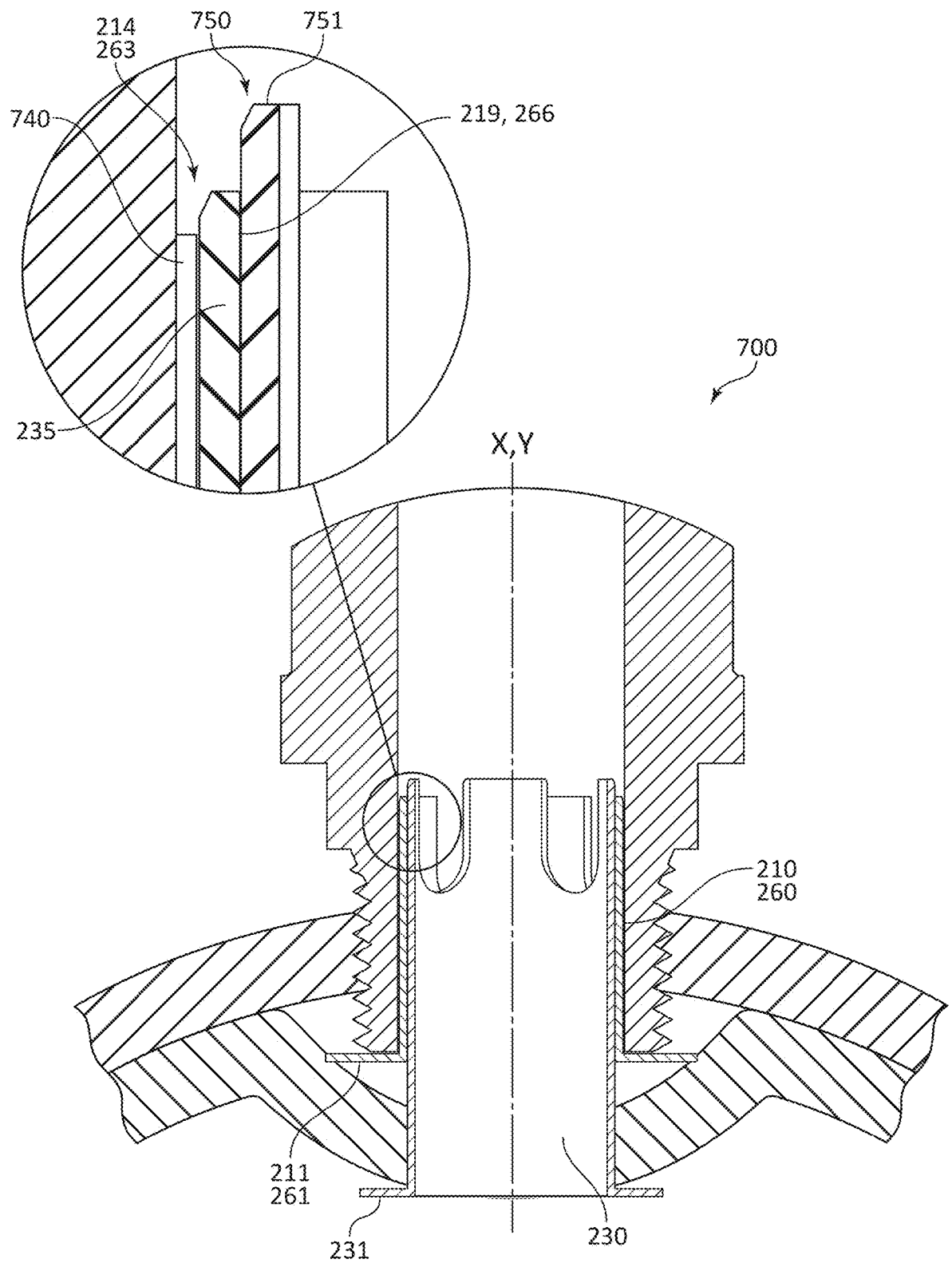
FIG. 7 illustrates a cross section through a service sleeve and a reinforcing sleeve of a fitting device assembly in an installed configuration according to exemplary embodiments of this disclosure.

As illustrated in FIG. 7, some embodiments of a fitting device assembly, e.g., fitting device assembly 700, may include a reinforcing sleeve 230 with an end 750 of reinforcing sleeve 230 distal to flange 231 that is free of an annular ratchet, and a service sleeve, e.g., service sleeve 210, 260. In such embodiments, an interior surface 219 of service sleeve 210, 260 may abut an outer surface 235 of reinforcing sleeve 230 and secure service sleeve 210, 260 together with reinforcing sleeve 230 by a friction force between interior surface 219 and outer surface 235. In addition, the force resulting from the spring back effect of cylindrical housing 232 of reinforcing sleeve 230 may cause end 750 of reinforcing sleeve 230 to push outward against engaging end 214, 263 of service sleeve 210, 260, further securing reinforcing sleeve 230 to service sleeve 210, 260. In some embodiments, an adhesive 740 lining an outer surface of service sleeve 210, 260 helps secure service sleeve 210, 260 to valve 150.

In some embodiments, outer surface 235 of reinforcing sleeve 230 may taper inward at end 750 at an angle of approximately 45° from a position about 0.01 inches from an axial end face 751 of end 750 to axial end face 751.

Figure 8:
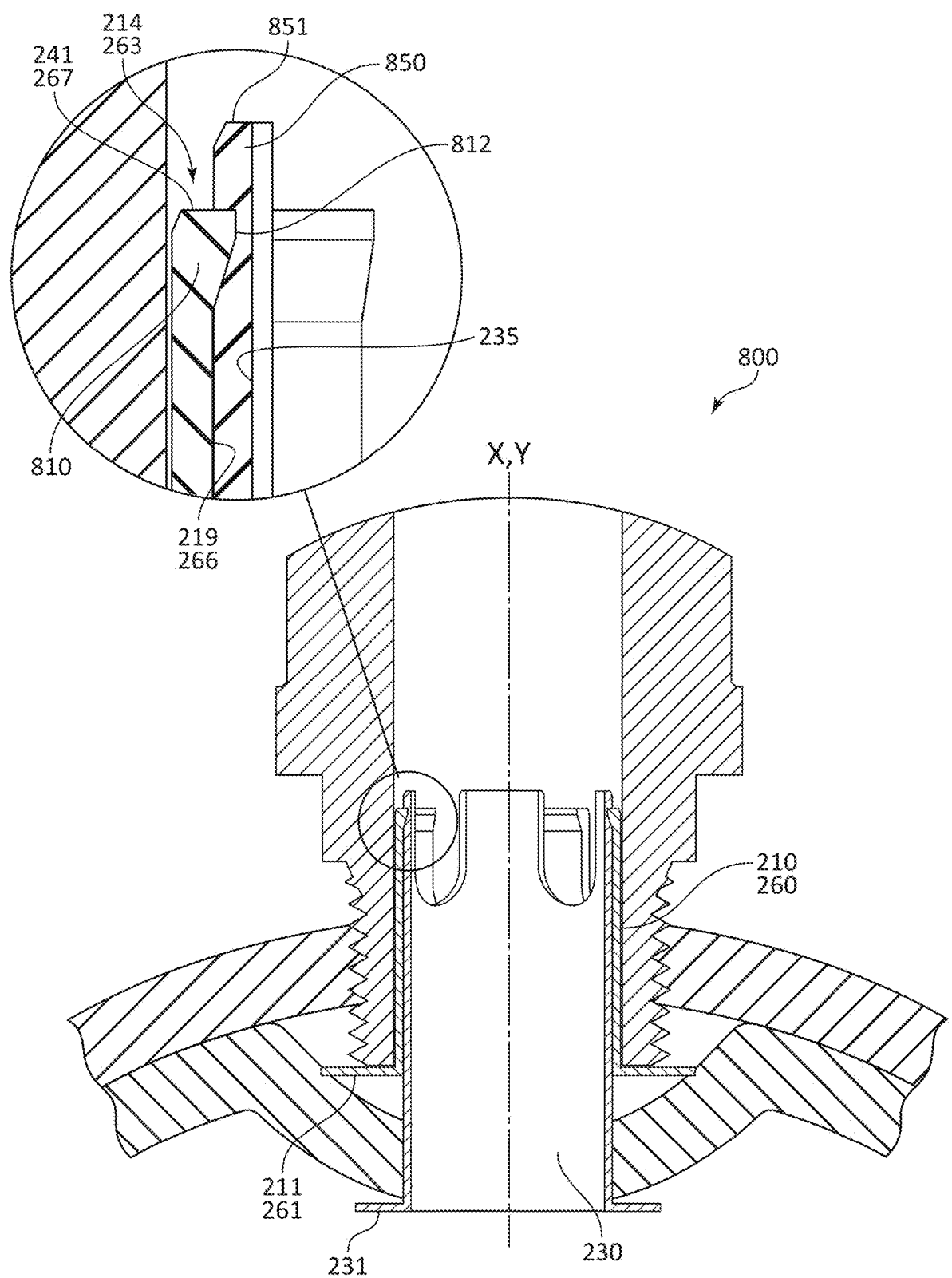
FIG. 8 illustrates a cross section through a service sleeve and a reinforcing sleeve of a fitting device assembly in an installed configuration according to exemplary embodiments of this disclosure.

As illustrated in FIG. 8, some embodiments of a fitting device assembly, e.g., fitting device assembly 800, may include a service sleeve 210, 260 with an interior surface 219, 266 that is tapered inward at engaging end 214, 263 of service sleeve 210, 260, and a reinforcing sleeve 230 with an end 850 distal to flange 231 that may be free of an annular ratchet. In such embodiments, interior surface 219, 266 of service sleeve 210, 260 and an interior surface 812 of annular ratchet 810 may engage with outer surface 235 of reinforcing sleeve 230 and secure service sleeve 210, 260 together with reinforcing sleeve 230 by a friction force between interior surfaces 219, 266, and 812 and outer surface 235. In addition, the force resulting from the spring back effect of cylindrical housing 232 of reinforcing sleeve 230 may cause end 850 of reinforcing sleeve to push outward against engaging end 214, 263 of service sleeve 210, 260, further securing reinforcing sleeve 230 and service sleeve 210, 260 together.

In some embodiments, interior surface 219, 266 may be tapered inward, for example, at an angle of approximately 15° from a position about 0.071 inches from axial end face 241, 267. In some embodiments, interior surface 219, 266 may straighten out at position about 0.015 inches from axial end face 241, 267. In some embodiments, annular ratchet 810 may be tapered inward at inner surface 812.

In some embodiments, outer surface 235 of reinforcing sleeve 230 may taper inward at end 850. By tapering outer surface 235 of end 850 and inner surface 812 of annular ratchet 810, engaging end 850 of reinforcing sleeve 230 more easily slide past annular ratchet 810 when reinforcing sleeve 230 is inserted into service sleeve 210, 260. In some embodiments, outer surface 235 may taper inward at an angle of approximately 45° from a position about 0.01 inches from an axial end face 851 of end 850 to axial end face 851.

Figure 9:
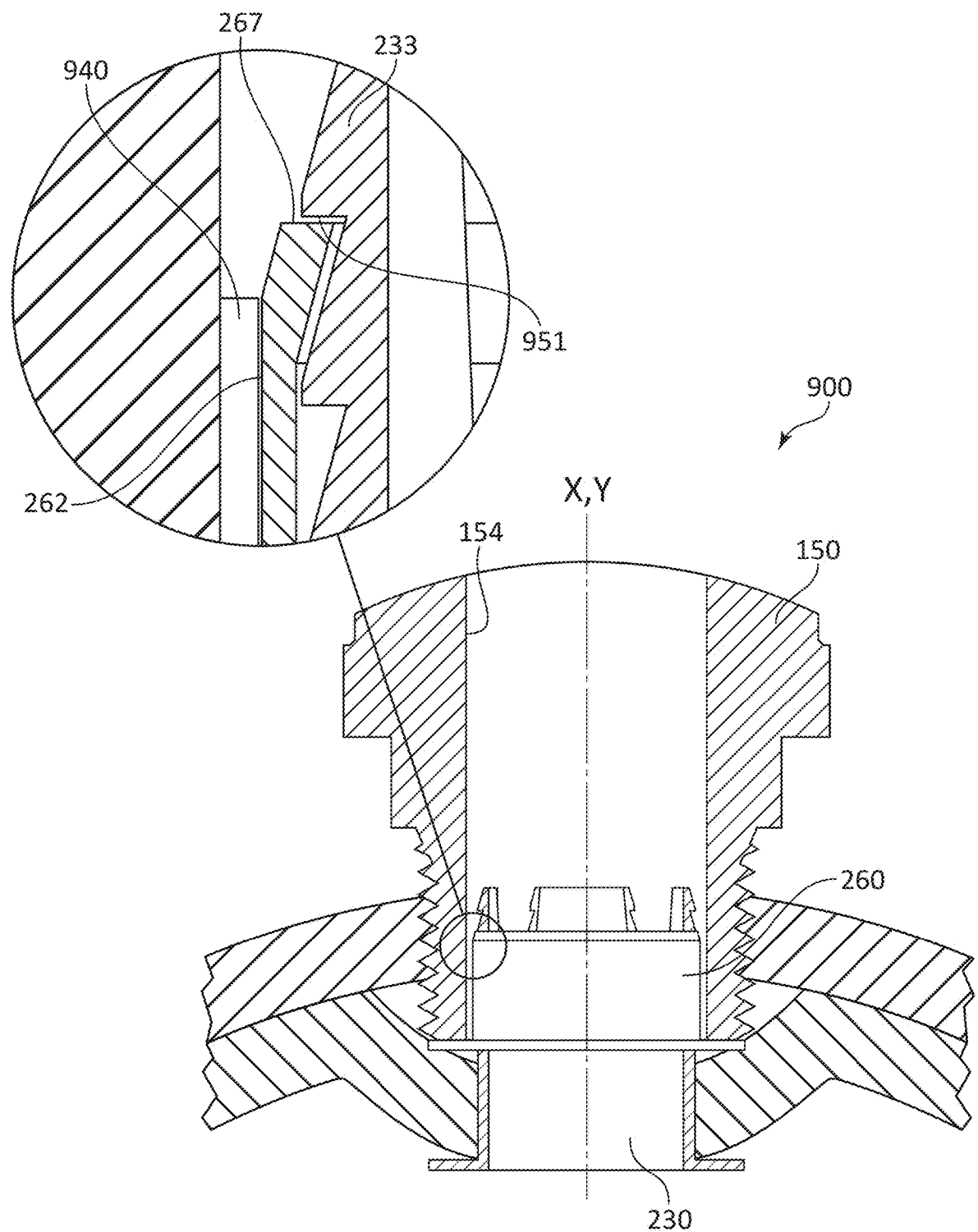
FIG. 9 illustrates a cross section through a service sleeve having no cutouts and a reinforcing sleeve of a fitting device assembly in an installed configuration according to exemplary embodiments of this disclosure.

FIG. 9 illustrates a fitting device assembly, e.g., fitting device assembly 900, that may include a service sleeve 260 free of one or more cutouts and a reinforcing sleeve 230. In some embodiments, axial end face 267 of service sleeve 260 may engage an axial surface 951 of a ratchet of one or more annular ratchets 233 of reinforcing sleeve 230 to secure reinforcing sleeve 230 to service sleeve 260 within valve 150. In some embodiments, an adhesive 940 may be positioned between interior annular surface 153 of valve 150 and outer annular surface 262 of service sleeve 260 and secure valve 150 to service sleeve 260.

Figure 11:
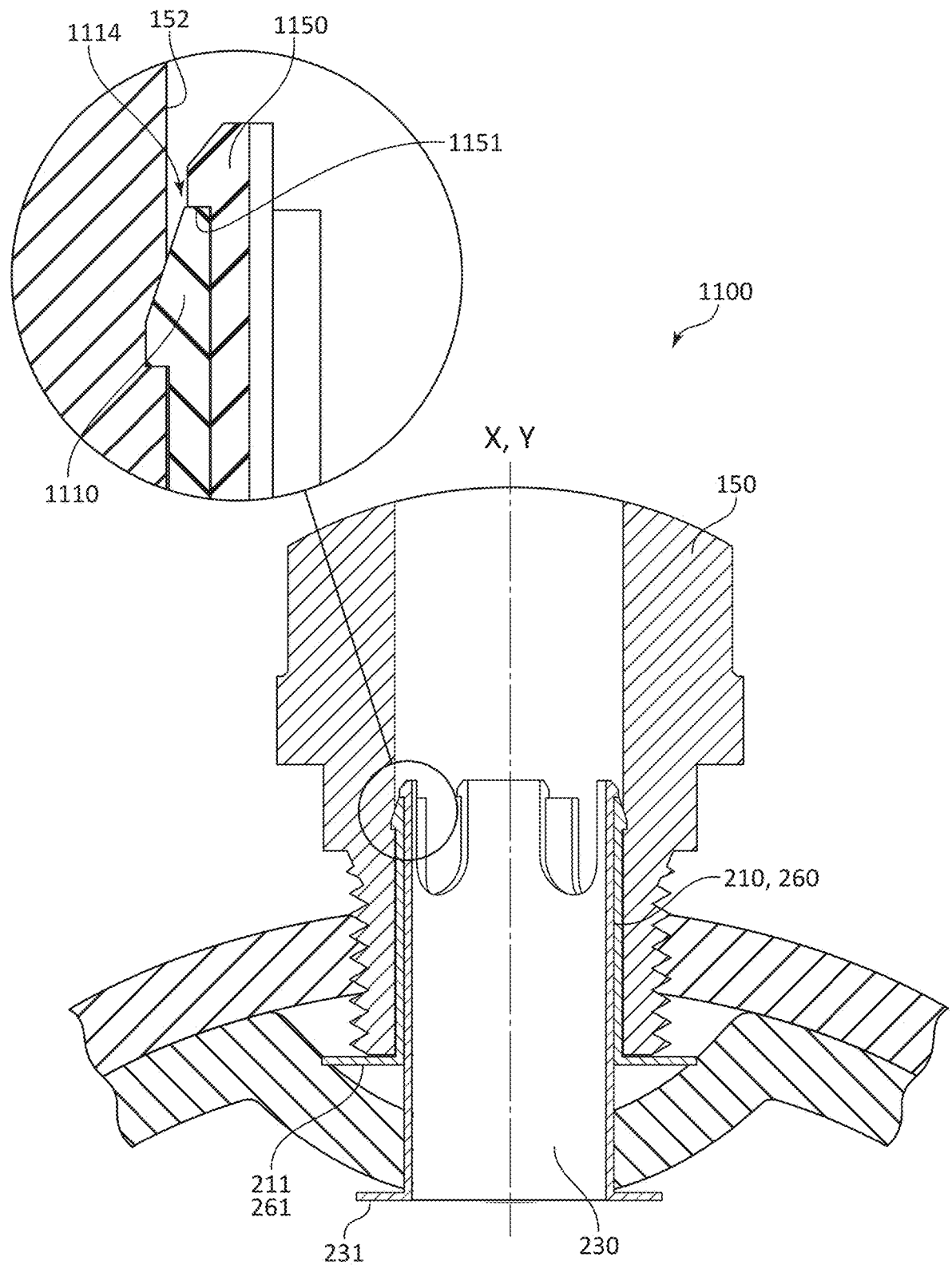
FIG. 11 illustrates a cross section of a fitting device assembly in an installed configuration showing an outer surface of a service sleeve according to exemplary embodiments of this disclosure.

As illustrated in FIG. 11, some embodiments of a fitting device assembly, e.g., fitting assembly 500, may include a reinforcing sleeve 230 that may include a single annular ratchet 550 positioned at an end of reinforcing sleeve 230 distal to flange 231 and a service sleeve, e.g., 210, 260 that may include a single annular ratchet 510 at engaging end 214, 263 end of service sleeve 210, 260 distal to flange 211 and formed on a radially outer side of service sleeve 210, 260. In such embodiments, an axial surface 1151 of annular ratchet 1150 may abut engaging end 1114 of service sleeve 210, 260 when reinforcing sleeve 230 is installed into service sleeve 210, 260. A radially outer surface of single annular ratchet 1110 of service sleeve 210, 260 may abut interior annular surface 152 of valve 150 and help to secure service sleeve 210, 260 to interior annular surface 152 of valve 150. In embodiments consistent with FIG. 11, an outer surface 216, 265 of service sleeve 210, 260 may not be covered in an adhesive, e.g., adhesive 316, 1018 (see FIG. 3B, 10B) in order for service sleeve 210, 260 to make direct contact with interior surface 152 of valve 150. In such embodiments, a friction fit between outer surface 216, 265 and interior surface 152 and a friction fit between annular ratchet 1110 and interior surface 152 may serve to secure service sleeve 210, 260 inside valve 150.

In some embodiments, annular ratchet 1110 may have an axial length of about 0.100 inches and include a radial extension of about 0.015 inches beyond an outer radius of sleeve 210, 260. In some embodiments, annular ratchet 1110 may taper inward at an angle of approximately 15° from a position about 0.075 inches from engaging end 214, 263 of service sleeve 210, 260 toward engaging end 214, 263.

In some embodiments, annular ratchet 1150 of reinforcing sleeve 230 may have an axial length of 0.050 inches and may taper inward at an angle of approximately 45° at a position about 0.025 inches from axial surface 1151 of annular ratchet 550. In some embodiments, axial surface 1151 may have a radial length of about 0.015 inches.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

We claim:

1. A method for reinforcing a coupling between a valve of a conduit pipe and a host pipe lined with a liner, the method comprising:
installing a cork assembly into the valve, the cork assembly comprising:
a service sleeve comprising:
a first flange;
an engaging end distal to the first flange; and
a cylindrical housing extending from the first flange to the engaging end; and
a cork disposed within the cylindrical housing of the service sleeve;
installing the liner in the host pipe, wherein a layer of epoxy secures the liner to the host pipe, and the first flange of the service sleeve of the cork assembly rests between the liner and the host pipe;
removing the cork from the cork assembly;
installing a reinforcing sleeve into the service sleeve in the valve, the reinforcing sleeve comprising:
a second flange;
an engaging end distal to the second flange; and
a cylindrical housing extending from the second flange to the engaging end, the cylindrical housing comprising:
at least one cutout extending from the engaging end toward the second flange; and
at least one annular ratchet formed on an outer surface of the reinforcing sleeve at the engaging end,
wherein a radius of the cylindrical housing of the service sleeve is greater than a radius of the cylindrical housing of the reinforcing sleeve,
wherein installing the reinforcing sleeve comprises:
inserting the reinforcing sleeve into the service sleeve until at least one annular ratchet engages the engaging end of the service sleeve and until the first flange contacts an interior surface of the liner.

2. The method of claim 1, wherein the cork of the cork assembly further comprises:
a body;
at least one radial appendage extending radially from the body, wherein the at least one radial appendage is plastically deformable; and
a first magnetic element disposed within the cork, the first magnetic element comprising:
at least one light source configured to illuminate when a second magnetic element is in a vicinity of the first magnetic element.

3. The method of claim 1, wherein a robotic device disposed within the host pipe installs the cork assembly, removes the cork form the cork assembly, and installs the reinforcing sleeve.

4. The method of claim 1, wherein removing the plastic cork further comprises:
detecting a location of the first magnetic element disposed within the cork;
drilling a hole through the liner at the location of the first magnetic element; and
drilling out the cork from the cork assembly through the hole in the liner.

5. The method of claim 4, wherein a robotic device disposed within the host pipe detects the location of the first magnetic element, drills the hole through the liner, and drills out the cork from the cork assembly.

* * * * *